(12) United States Patent
Öjelund et al.

(10) Patent No.: US 12,138,132 B2
(45) Date of Patent: Nov. 12, 2024

(54) METHOD FOR GENERATING DENTAL MODELS BASED ON AN OBJECTIVE FUNCTION

(71) Applicant: 3SHAPE A/S, Copenhagen (DK)

(72) Inventors: Henrik Öjelund, Copenhagen (DK); Karl-Josef Hollenbeck, Copenhagen (DK); Erik Ask, Malmö (SE)

(73) Assignee: 3Shape A/S, Copenhagen (DK)

( * ) Notice: Subject to any disclaimer, the term of this patent is extended or adjusted under 35 U.S.C. 154(b) by 507 days.

(21) Appl. No.: 17/429,108

(22) PCT Filed: Feb. 6, 2020

(86) PCT No.: PCT/EP2020/053005
§ 371 (c)(1),
(2) Date: Aug. 6, 2021

(87) PCT Pub. No.: WO2020/161245
PCT Pub. Date: Aug. 13, 2020

(65) Prior Publication Data
US 2022/0008175 A1    Jan. 13, 2022

(30) Foreign Application Priority Data

Feb. 6, 2019  (DK) .......................... PA 2019 70083
Feb. 28, 2019 (DK) .......................... PA 2019 70139

(51) Int. Cl.
*A61C 13/00*   (2006.01)
*A61C 5/77*    (2017.01)
(Continued)

(52) U.S. Cl.
CPC ............ *A61C 13/0004* (2013.01); *A61C 5/77* (2017.02); *A61C 13/0019* (2013.01);
(Continued)

(58) Field of Classification Search
CPC ... A61C 13/0004; A61C 5/77; A61C 13/0019; G06N 20/20; G06N 20/10; G06N 3/045;
(Continued)

(56) References Cited

U.S. PATENT DOCUMENTS

2005/0089822 A1    4/2005  Geng
2016/0175068 A1*   6/2016  Cai ........................ A61C 7/002
                                                             700/98

(Continued)

FOREIGN PATENT DOCUMENTS

CN    107773316 A    3/2018
CN    108389207 A    8/2018
(Continued)

OTHER PUBLICATIONS

International Search Report (PCT/ISA/210) and Written Opinion (PCT/ISA/237) mailed on Jun. 26, 2020, by the European Patent Office as the International Searching Authority for International Application No. PCT/EP2020/053005.
(Continued)

*Primary Examiner* — Gabriel I Garcia
(74) *Attorney, Agent, or Firm* — Buchanan Ingersoll & Rooney PC

(57) ABSTRACT

A computer-implemented method of generating a dental model based on an objective function output, including creating an objective function including at least one quality estimation function which trains at least one machine learning method that generates quality estimation output, and an objective function output is the output of the objective function providing a model as an input data to the objective function and generating model-related objective function output; and modifying the model based on the model-related
(Continued)

objective function output to transform the model to a generated model, wherein the generated model is the dental model.

18 Claims, 13 Drawing Sheets

(51) Int. Cl.
*G06N 3/045* (2023.01)
*G06N 20/10* (2019.01)
*G06N 20/20* (2019.01)
*G06T 19/20* (2011.01)

(52) U.S. Cl.
CPC .............. *G06N 3/045* (2023.01); *G06N 20/10* (2019.01); *G06N 20/20* (2019.01); *G06T 19/20* (2013.01); *G06T 2207/30036* (2013.01); *G06T 2210/56* (2013.01); *G06T 2219/2021* (2013.01)

(58) Field of Classification Search
CPC ........... G06T 19/20; G06T 2207/30036; G06T 2210/56; G06T 2219/2021
USPC ......................................................... 382/128
See application file for complete search history.

(56) References Cited

U.S. PATENT DOCUMENTS

| | | |
|---|---|---|
| 2018/0028294 A1 | 2/2018 | Azernikov et al. |
| 2018/0085203 A1 | 3/2018 | Ramirez et al. |
| 2019/0259220 A1* | 8/2019 | Lancelle ................ G06T 15/50 |
| 2019/0333224 A1 | 10/2019 | Liu et al. |
| 2020/0273248 A1 | 8/2020 | Jørgensen et al. |

FOREIGN PATENT DOCUMENTS

| | | |
|---|---|---|
| CN | 108491850 A | 9/2018 |
| CN | 109310488 A | 2/2019 |
| WO | 2017220619 A1 | 12/2017 |
| WO | 2018/218988 A1 | 12/2018 |
| WO | 2019/002631 A1 | 1/2019 |
| WO | 2020/173912 A1 | 9/2020 |

OTHER PUBLICATIONS

Fisher, "Surface Curvature" From surfaces to objects: computer vision and three dimensional scene analysis. New York: Wiley, 1989.

Gotsman, Craig, et al "Fundamentals of spherical parameterization for 3D meshes" ACM Transactions on Graphics (TOG). vol. 22, No. 3, ACM, 2003, 6 pages.

Nelson and Ash: Wheeler's Dental Anatomy, Physiology, and Occlusion, 9th ed. p. 292.

Qi, Charlesl R., et al "Pointnet: Deep learning on point sets for 3d classification and segmentation" Proc. computer Vision and Pattern Recognition (CVPR), IEEE 1.2, 2014, 10 pages.

Sporring et al; "Bayes reconstruction of missing teeth". Journal of Mathematical Imaging and Vision 31:245-254. Jul. 2008, DOI 10.1007/s10851-008-0081-6, 11 pages.

Zou, Chuhang, et al "3d-pmn: Generating shape primitives with recurrent neural networks" 2017 IEEE International Conference on Computer Vision (ICCV), IEEE, 2017, 10 pages.

* cited by examiner

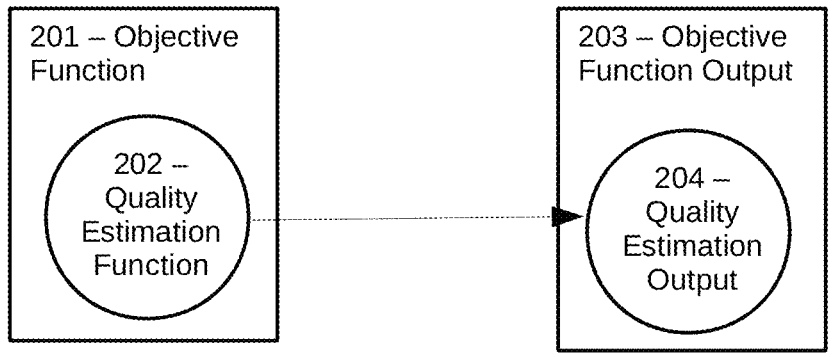
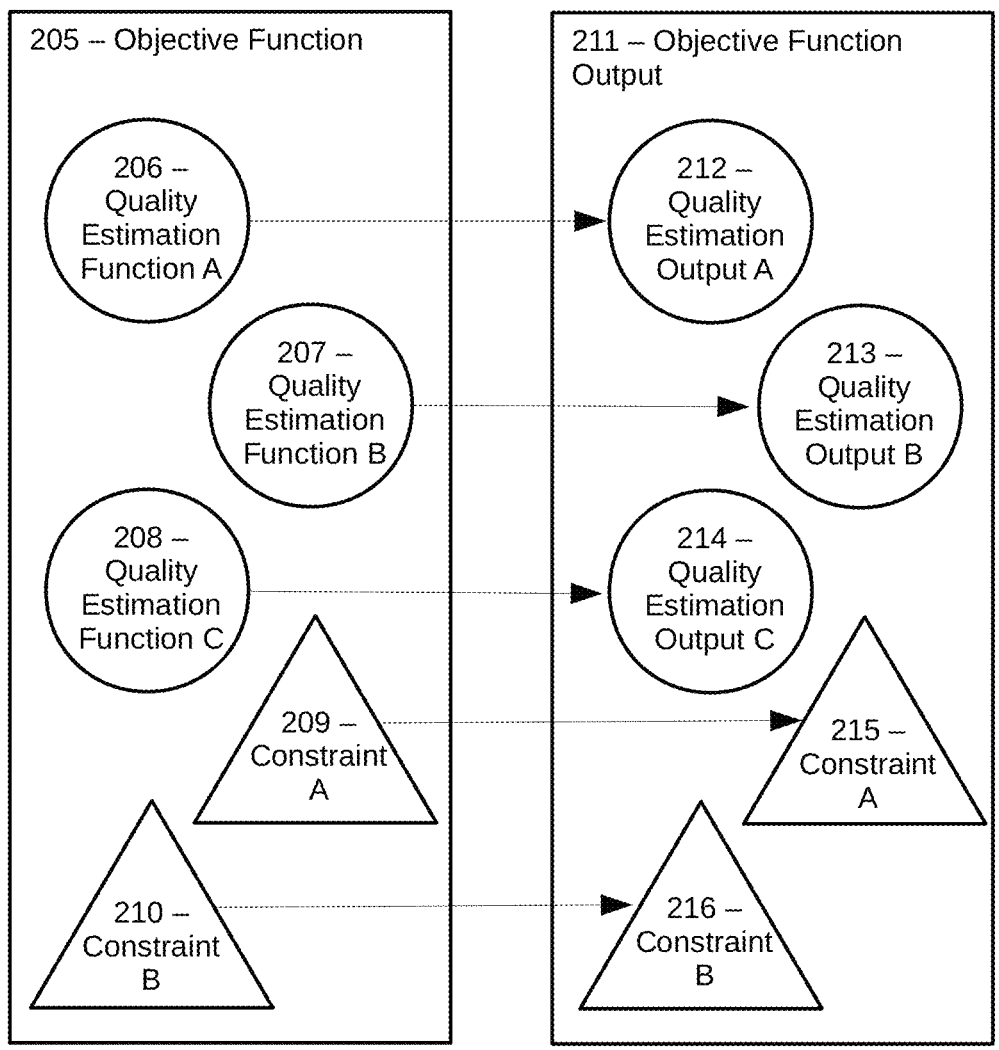

FIG. 6A $$\mathcal{M} = \{\mathcal{P}, \mathcal{F}\}$$
$$\mathcal{P} = \{\mathbf{p}_1, \ldots, \mathbf{p}_V\}, \qquad \mathbf{p}_i \in \mathbb{R}^3$$
$$\mathcal{F} = \{f_1, \ldots, f_F\}, \qquad f_i \in \mathcal{P} \times \mathcal{P} \times \mathcal{P}$$

FIG. 6B $$C(\mathcal{M}, \bar{\mathcal{M}})$$

FIG. 6C $$L\big(C(\mathcal{M}, \bar{\mathcal{M}})\big) = l \in \mathbb{R}^1$$
$$T = \Big\{\{\mathcal{M}_1, \bar{\mathcal{M}}_1, l_1\}, \ldots, \{\mathcal{M}_K, \bar{\mathcal{M}}_K, l_K\}\Big\}$$

FIG. 6D $$\theta' = \underset{\theta}{\operatorname{argmin}} \sum_{i=1}^{K} g\big(l_i - L(\mathcal{M}_i, \bar{\mathcal{M}}_i)\big)$$
$$\mathcal{M}' = \underset{\mathcal{M}}{\operatorname{argmin}} \; L'\big(C(\mathcal{M}, \bar{\mathcal{M}})\big)$$
$$\boldsymbol{\beta}' = \underset{\boldsymbol{\beta}}{\operatorname{argmin}} \; L'\big(C(\mathcal{M}(\boldsymbol{\beta}), \bar{\mathcal{M}})\big)$$

FIG. 6E $$l(\boldsymbol{\beta}) = \sum_{\text{Over all pixels}} \big(C(\mathcal{M}(\boldsymbol{\beta}), \bar{\mathcal{M}}) - C(\mathcal{M}(0), \bar{\mathcal{M}})\big)^2$$

FIG. 9
901
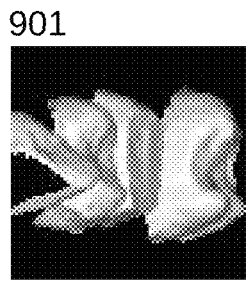
906
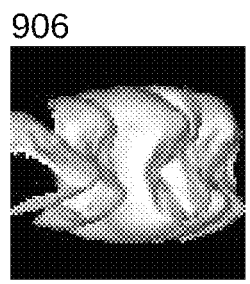
902
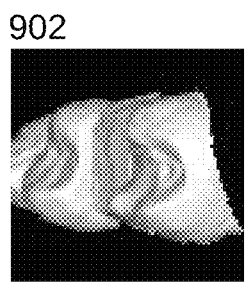
907
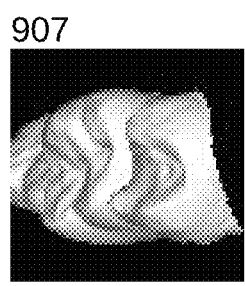
903
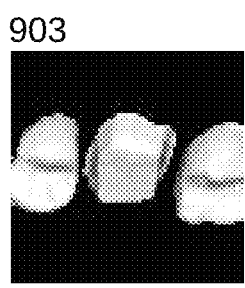
908
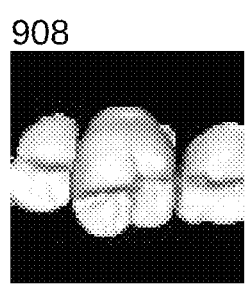
904
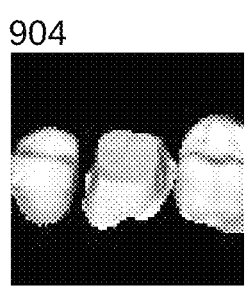
909
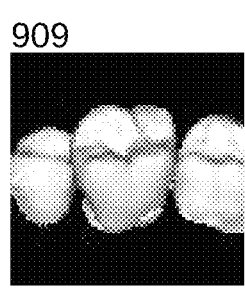
905
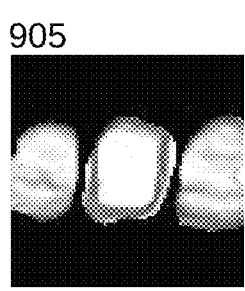
910
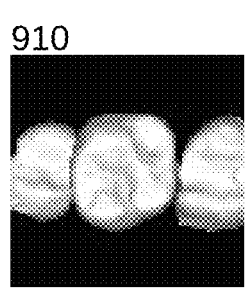

FIG. 10
1001 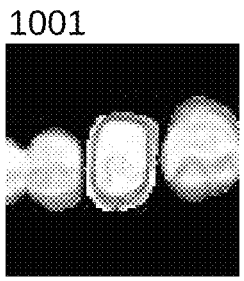
1006 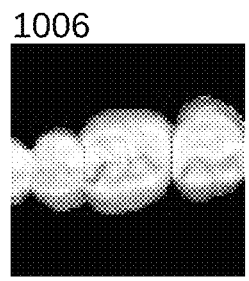
1011
16,00342
1002 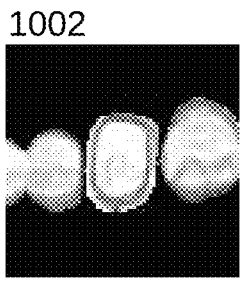
1007 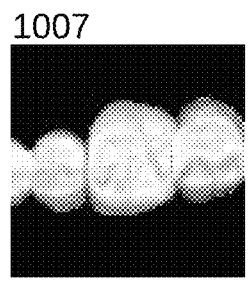
1012
22,77108
1003 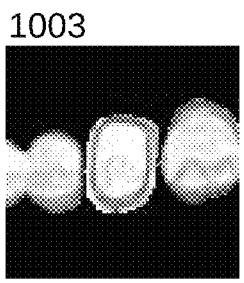
1008 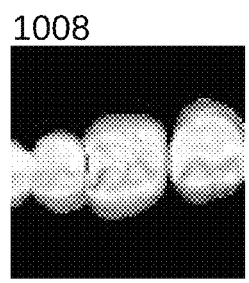
1013
13,26913
1004 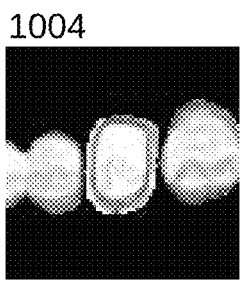
1009 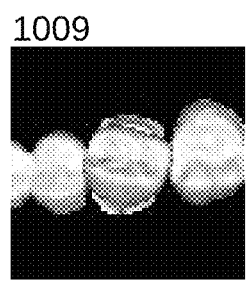
1014
29,06376
1005 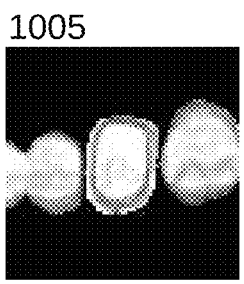
1010 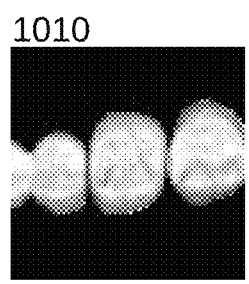
1015
10,96197

FIG. 12
| 1201 | 1202 | 1203 |
|---|---|---|
| 256.25 | 61.93 | 22.75 |
1204             1205             1206
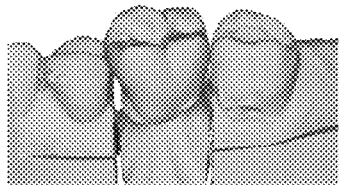 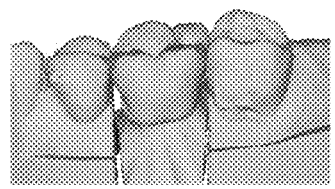 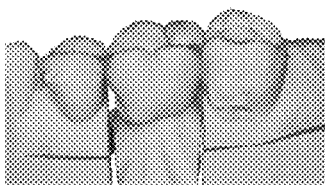
1207             1208             1209
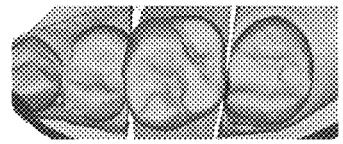 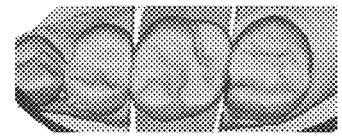 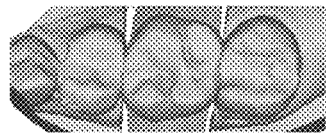

METHOD FOR GENERATING DENTAL MODELS BASED ON AN OBJECTIVE FUNCTION

FIELD

This disclosure generally relates to a system and a computer-implemented method of generating a dental model based on the output of an objective function.

BACKGROUND

Dental restorations are often created in a workflow comprising 3D scanning, computer-aided design (CAD), and physical manufacture. The CAD software takes the scanned 3D model of the patient's oral situation as input. Typically, a user of the CAD software such as a dental professional virtually sculpts one or more library (or template) models of restorations such as crowns to make the sculpted model fit into said oral situation. Creating the outer surface of the restoration, the sculpting process, remains a time-consuming and subjective task.

Machine learning has made it possible to automate many previously time-consuming and tedious tasks. However, machine learning usually requires collecting a lot of good quality data. This can be a major technical challenge, in finding sourcing, storing, transferring, and standardizing the data. Further, medical and dental applications often require human data, which creates legal concerns as well. For example, generating dental restorations with conventional machine learning methods may require a large data set of high-quality three-dimensional scans of similar dental restorations, which can be difficult to obtain both technically and legally.

In addition, machine learning uses algorithms that learn from data, rather than rule-based algorithms, Frequently, machine learning methods may fail to take into account hard constraints. In dental restorations, for example, a conventional machine learning method may generate a restoration fails to meet a material-dependent minimum thickness.

SUMMARY

According to an embodiment, a computer-implemented method of generating a model based on an objective function output, comprising:
creating an objective function comprising at least one quality estimation function, wherein
 each of the at least one quality estimation function trains at least one machine learning method that generates quality estimation output based on training input data to be at least substantially the same as training target data, and
 an objective function output is the output of the objective function, and comprises the quality estimation output of the at least one quality estimation function, a portion thereof, a function thereof, and/or combinations thereof;
providing a model as an input data to the objective function and generating model-related objective function output; and
modifying the model based on the model-related objective function output to transform the model to a generated model.

In one embodiment, the generated model is a dental model.

The disclosure describes a method where machine learning is used to help determine an objective function output fora model, by means of an objective function.

According to different embodiments, a model is a two-dimensional or three-dimensional object. A model may be a representation of an underlying object, for example, a 3D mesh representing a dental crown.

A two-dimensional object is an object that exists in two dimensions. A three-dimensional object is an object that exists in three dimensions. In various embodiments of this disclosure, three-dimensional objects may include, but are not limited to: physical objects such as dental restorations and dentition, digital objects such as models of individual teeth, and scans of physical objects such as dental restorations and ears.

A quality estimation function generates a quality estimation output. A quality estimation output is an assessment of the quality of the model, such as a scalar number. However, expressing the quality estimation output in other forms is also possible, for example, a plurality of scalars, and/or other expressions of quality. As discussed below, the quality estimation output may be based on objective or subjective criteria.

According to an embodiment, the quality estimation function may be any function that reduces many input values to a quality estimation output. The quality estimation function may use a machine learning method. In various embodiments, the machine learning method may comprise one or more of the following: principle component analysis, kernel principle component analysis, linear discriminant analysis, generalized discriminant analysis, singular value decompositions, convolutional neural networks, deep neural networks, dense neural networks, artificial neural networks, recurrent neural networks, decision trees, random forests, support vector machines, nearest neighbor methods, gradient boosting, regression (linear or non-linear, multivariate or univariate), a portion thereof, and/or any combination thereof.

Machine learning methods make predictions by transforming input data to output data, i.e. the prediction, in this embodiment. For a machine learning method to make a prediction, it is first trained. Training a machine learning method requires training data, which comprises input data and target data, where the output data is expected to at least substantially match the target data, and different parts of the machine learning method are changed to accomplish this. Once the machine learning method is trained, it can generate output data at least substantially the same as the target data, even with new input data.

The objective function is comprised of at least one quality estimation function. An objective function comprised of multiple quality estimation functions, however, may allow different sources of input data to be used in determining the quality of a model.

The objective function generates objective function output, which is based on the quality estimation output(s). For quality estimation outputs, the objective function output may be, for example: a modification of a single quality estimation output, a sum of quality estimation outputs, a sum of weighted quality estimation outputs, a product of quality estimation outputs, the result of a function of quality estimation outputs such as finding a minimum value or all values beyond a threshold.

The generated model is a transformation of the model with a better objective function output, as discussed below.

In an embodiment to generate dental restorations, the disclosure provides an appropriate objective function to determine the quality for the complex shapes that dental restorations are, even when the notion of a "good" restoration cannot be formulated mathematically by the humans who have designed the dental restorations. The objective function may then be used to determine an optimal shape of a dental restoration by optimizing at least one parameter that expresses said shape of the dental restoration.

An embodiment further comprises where the objective function is used as an automated quality assessment of an existing model.

The objective function in the method disclosed above may be used as an automated quality assessment of an existing model, allowing faster results than human assessment and a high volume of results in a short time frame. This may be used for the assessment of both machine-generated and human-generated models. For example, an objective function that determines the quality of a dental crown may be used to evaluate the output of a machine-generated crown, or the dental restorations made by of dental students for pedagogical purposes.

An embodiment further comprises proceeding,
starting with providing new input data based on an initial model to the objective function,
to generate objective function output based on the new input data in an iterative manner,
with the new input data based on a transformed model generated in response to the objective function output of the objective function acting as the new input data for a next iteration,
until a predetermined criterion is reached,
wherein the transformed model that corresponds to reaching the predetermined criterion represents the generated model.

In an embodiment, the objective function may be used iteratively to improve a model. An initial model may be the first model used as input into the objective function. First, the initial model may be evaluated based on the objective function. The initial model is then transformed into a transformed model based on the objective function output. The transformed model is then evaluated on the objective function and transformed again, such that the objective function output is improved. The process repeated until a predetermined criterion is reached.

The predetermined criterion may be, for example, a set number of iterations, or an optimum of the objective function, as discussed below.

The generated model is the final transformed model, i.e. the transformed model where the predetermined criterion is reached.

In an embodiment where the objective function is a function whose slope can be evaluated, the disclosure here may be similar to the process of gradient descent, where small, incremental changes are made based on the slope of the last change.

For example, to generate a dental crown, an initial model may be an initial dental crown, which is iteratively evaluated and transformed until a predetermined criterion. The transformed model at the predetermined criterion is the generated model, and the corresponding dental crown has a good score as objective function output.

An embodiment further comprises where the predetermined criterion comprises an optimum of the objective function.

As discussed above, the predetermined criterion decides where to stop iterating to further transform a transformed model, and thus determines what the generated model is. An objective function may have at least one optimum, where the objective function is at a local or global maximum or minimum. In the event there is no optimum, the predetermined criterion may be where an asymptote sufficiently flattens out.

The optimum may be found by gradient descent. If the objective function is expressed as a solvable mathematical function, for example, a quadratic equation, it may be solved for as well.

An embodiment further comprises selecting a suitable model from a plurality of models,
based on the objective function output of each of the plurality of models, In an embodiment, the objective function is used to select a suitable model from a plurality of models, where the suitable model is the model with the best score as determined by the objective function. The best score depends on the particular configuration of each objective function, and examples are discussed below.

The method may be used for the assessment of both machine-generated and human-generated models, enabling the quick selection of a suitable model from many models, as determined by the objective function. For example, a library of dental crowns may be quickly evaluated with the objective function, and the dental crown with the best score of the objective function output chosen for use, In an embodiment, the suitable model may be the initial model for a generated model based on the iterative process described above. For example, an initial model of a dental crown may be chosen from a library of dental crowns based on its objective function output, and then transformed iteratively to improve its objective function output.

An embodiment further comprising transforming the initial model and/or the transformed model by means of at least one shape parameter,
wherein the at least one shape parameter controls an aspect of the shape of the initial model and/or the transformed model,
and the transformation is based on the quality estimation output and/or the objective function output.

An embodiment further uses shape parameters to transform the initial model and/or transformed model.

A parameter can be used to both define and change the object it characterizes. A shape parameter is a parameter that controls the geometry of a model in some way, and may be subject to different mathematical operations. For example, a model might have a shape parameter of height. If the height changes from 5 mm to 10 mm, the shape parameter's value has increased 5 mm, but it has also doubled.

Objects may be parametrized in Euclidean space, where shape parameters include but are not limited to: translation, rotation, shearing, scale, reflection, mapping, and/or other functions. Three-dimensional model may also be parametrized through, for example: spherical harmonics, other spherical parametrizations, radial basis functions describing a vector field of distortion, Objects may also be parametrized in other ways, for example, by using the principal components from a principal component analysis.

A change in the shape parameter may change the shape of the model, which in turn may change at least one quality estimation output and/or objective function output. In an embodiment using the iterative process described above, the shape parameter may be changed based on at least one quality estimation function and/or the objective function, for example, in a process of gradient descent.

In an embodiment generating a dental crown, shape parameters such as size, rotation, translation, and spherical parametrizations may control the shape of the crown. A suitable dental crown may be generated where the shape parameters are iteratively changed based on at least one quality estimation output and/or objective function output.

An embodiment further comprises wherein the objective function further comprises at least one constraint, wherein said at least one constraint implements at least one rule, such that if the initial model or the transformed model violates the at least one rule, the objective function output from the objective function is changed.

Objective functions comprised only of quality estimation functions may fail to consider hard constraints that are not captured in a quality assessment. For example, where the model is a dental crown, a good objective function output may still result in in a model that fails to meet a hard constraint such as a minimum thickness required for a particular material.

A constraint may solve this problem by changing the objective function output to discriminate against models that do not follow the rules.

For example, a constraint may express that the distance between points on neighboring surfaces must never be negative, as negative values would indicate collisions with neighboring objects. Examples of constraints in generating a dental restoration include, but are not limited to: minimum material thickness, design preferences such as some occlusal clearance, general principles for good design of dental restorations such as connecting a crown to a preparation line or margin.

A constraint may also quantify the tradeoff between two or more desired properties for the model. To provide approximate solutions with optimization algorithms, the constraints may also be added to the objective function with relatively large weights. The solution found with the approximate solutions may violate the constraints slightly, but that may be tolerable as long as rule violations are within the range of other uncertainties associated with producing dental restorations, e.g., the accuracy of a milling machine that will produce the restoration.

An embodiment may implement a constraint by applying a penalty. For example, if the objective function has a best score at a minimum of the objective function, a constraint may add a quantity that increases the objective function output so that it is no longer a minimum. This can be viewed as a form of regularization of the optimization problem.

An embodiment further comprises where the training target data is a difference measure, comprising at least one measured difference between a sample model and an ideal model, and the training target data is based on the sample model and the ideal model.

As discussed above, a quality estimation function may be a machine learning method that generates a quality estimate output. In such case, the training target data may be a difference measure, which is a measure of an actual error, i.e. a difference in volume or distance between a model and an ideal model. An ideal model may be a model known to be the ground truth, and may be used as a comparison point for other models. This means that the quality estimation function can be trained with relatively little collected data, avoiding some of the major problems in data collection as discussed above.

For example, in generating a dental crown, there might be a ground truth from an ideal dental crown designed by a dental professional for a specific oral situation. Another dental crown may be compared to the ideal dental crown by measuring, for example: the difference in volume, the average distance between certain points on the surface, a summed difference in pixel values where the dental crowns are represented by pseudo-images, an average distance between the vertices of a 3D mesh and the surface of another 3D mesh where the dental crowns are represented by 3D meshes. This difference measure may then be used to train the quality estimate function.

A method according to one or more of the preceding claims, where the training target data is an estimated difference measure, comprising at least one estimated difference between a sample model and an ideal model, and the training input data is based on the sample model and the ideal model.

Where a quality estimation function comprises a machine learning method, the training target data may be an estimated difference measure. As discussed above, the training target data may be a difference measure. However, measuring an actual difference may be impracticable or impossible, for example, in measuring the volume of a dental crown that is already in a patient's mouth. In such case, estimating the difference may be more useful than measuring it directly.

For example, in generating a dental crown, the ideal dental crown may already be installed in the oral situation, and thus difficult to take out and measure. Therefore, an estimate may be made based on the difference between an image of the ideal dental crown and an image with another dental crown in its place.

An embodiment further comprising where the training target data for a quality estimation function is a subjective quality measure, comprising a value representing the subjective quality of a sample model, and the training input data is based on the sample model.

While many applications evaluate a model objectively, at times, subjective measures may be useful in generating a model. Thus, the training target data for a quality estimation function may also come from a subjective quality measure. A subjective quality measure may be a measure based on personal judgment, taste, or opinions. Subjective quality measures may be, for example, scalar numbers in a database, suitable as target training data.

For example, in designing dental restorations in line with dental professionals' best practices, such practices may be expressed only subjectively. For example, silhouettes as seen along the mesial-distal axis may be similar. As another example, the proper location of contact points is generally also only expressed non-mathematically, and it is generally recognized that the notion of an ideal occlusion with all theoretically described contact points is not even practical (Nelson and Ash: Wheeler's Dental Anatomy, Physiology, and Occlusion, 9th ed., p. 292).

A subjective quality measure may also accommodate elements of personal preference and style. For example, there are various libraries for crowns that differ in shape, particularly of the occlusal table. Examples of such libraries, or groups thereof, are Culp (young and mature), DS Allure, Nondas, and PTC. While all of these are anatomically correct, different dental technicians often have different preferences.

The disclosed methods provide an appropriate objective function for the complex shapes that dental restorations are, even when the notion of a "good" restoration cannot be formulated mathematically by the humans who have designed the dental restorations. The objective function may then be used to find an optimal shape of a dental restoration by optimizing at least one parameter that express said shape of the dental restoration.

An embodiment further comprises where initial model, the transformed model, and the generated model are 3D objects, and the training input data and the new input data comprise at least one representation of at least one of the 3D objects, Three-dimensional objects may be represented in several ways. Two-dimensional representations of three-dimensional objects include but are not limited to: depth maps, pseudo-images based on depth information, pseudo-images based on curvature information, cross sections, projections to a spherical surface, curvature estimators, other multi-angle images.

Two-dimensional representations are often represented at pixel arrays. It may be advantageous to use two-dimensional representations because the data size is easily reduced, for example, by reducing the number of pixels.

A depth map is a two-dimensional representation of a three-dimensional object, comprising at least one image or image channel that conveys information about the distance of the 3D surface from a viewpoint. For example, where the depth map is from a digital photograph, the grayscale value of a pixel may convey how far the surface of the 3D object is from the camera. Depth maps may be taken from multiple views to capture different parts of a three-dimensional object.

A pseudo-image based on depth information is a two-dimensional representation of a three-dimensional object, comprising at least one image or image channel that conveys information about the distance of the 3D surface from a viewpoint. The depth information may be calculated from a 3D object, for example, from the facet normal of a 3D scan, and may be normalized.

A pseudo-image based on curvature information is a two-dimensional representation of a three-dimensional object, comprising at least one image or image channel that conveys information about the curvature of the 3D surface from a viewpoint ("Surface Curvature", from Fisher, Robert B. *From surfaces to objects: computer vision and three dimensional scene analysis*. New York; Whey, 1989), Pseudo-images can have multiple images or multiple image channels. Multiple images or multiple image channels can represent different angles to view an object, different aspects of an object, and/or variations of the object, e.g., in the object in different states or different periods of time.

In an embodiment, a pseudo-image based on depth information may be rendered based on a three-dimensional scan of a three-dimensional object. The pseudo-image may be a two-dimensional pixel array, where the grayscale value of each pixel may be calculated, for example, based on its distance from a viewpoint to the surface of the three-dimensional scan, or as a dot product of the direction of a ray from a viewpoint and the angle of the surface that the ray hits.

Although any set of values may be normalized, it may be advantageous to create pseudo-images of dot products because the dot product's range may be limited from zero to one, inclusive, and such images can easily be normalized. Images based on the dot product may be independent of the actual distance between a viewpoint and the three-dimensional object.

For an embodiment involving a dental application, to achieve proper coverage of the 3D surface by a set of 2D pseudo-images based on depth information, said pseudo-images may be rendered from multiple view directions, such as from occlusal, mesial, distal, buccal, and/or lingual directions. Due to possible occlusion by neighboring teeth, it may be advantageous to show mesial and distal pseudo-images from an oblique view direction, such as 45 degrees from the occlusal view. The multiple views can be represented, for example, as multiple channels in a pseudo-image, as a series of images, and/or independently.

The pseudo-images may represent the location of the dental restoration, and also neighboring and antagonist teeth. The pseudo-images may also represent larger parts of the dentition. For example, for aesthetic crowns on anterior teeth, all teeth visible when the patient is smiling can advantageously be represented in the pseudo-images.

In some embodiments, the pseudo-images may also represent the oral situation before design of the restoration, as prepared by a dentist. The oral situation may be the starting point for traditional dental CAD, so including it may improve the automatic design of this invention.

A cross section may be a surface or shape exposed by a cut through a three-dimensional object. A series of these may be used to express a three-dimensional object as a series of two-dimensional images.

A three-dimensional object may be projected to a spherical surface, and this spherical surface may be represented by a two-dimensional image (see, e.g. Gotsman, Craig, Xianfeng Gu, and Alla Sheffer, "Fundamentals of spherical parameterization for 3D meshes." *ACM Transactions on Graphics (TOG)*. Vol. 22. No. 3. ACM, 2003), Three-dimensional representations of three-dimensional objects include but are not limited to: volumetric representations, point clouds, primitive-based models, meshes.

Three-dimensional representations may also be used by the hourglass predictor (Danish Patent Application PA 2019 70132), though their data formats may require some preprocessing before being used by a neural network. Three-dimensional machine learning is a challenging problem in the art, as three-dimensional data formats may be so large that they are difficult to process efficiently.

Volumetric representations use three-dimensional pixels known as voxels, and may be represented as a matrix format, where each element has three dimensions—the x, y, and z coordinates. Point clouds, which are collections of points in three-dimensional space, and may be used through a system such as PointNet (Qi, Charles R., et al. "Pointnet: Deep learning on point sets for 3d classification and segmentation." Proc. Computer Vision and Pattern Recognition (CVPR), IEEE 1.2 (2017): 4). Primitives may also be used as a neural network, for example, through at least one depth image and numbers that contain information about the configuration of the primitives (Zou, Chuhang, et al. "3d-prnn: Generating shape primitives with recurrent neural networks," 2017 IEEE International Conference on Computer Vision (ICCV). IEEE, 2017).

A mesh is a collection of vertices, edges, and faces. Vertices are individual points representing the surface, edges are lines connecting the vertices, and faces are continuous areas surrounded by vertices and edges. Meshes may also be used in neural networks, for example, in a manner similar to point clouds, or in a process described in Danish Patent Application PA 2019 70130.

An embodiment further comprises where the training input data is a plurality of perturbations,
generated by using at least one known model, where each of the at least one known model is transformed into a set of perturbations,
and the plurality of perturbations comprises all of the sets of perturbations.

In an embodiment, the training input data may be a plurality of perturbations, where a perturbation is a transformed version of a known model. A known model here would be an existing model, for example, a library crown.

The perturbations may be generated by transforming the known model into different variations. This may be achieved, for example, by generating a Gaussian distribution of values for different shape parameters for a 3D mesh representing a known model, and using the values as shape parameter values with the known model to generate perturbations. More than one known model may be used.

A common problem in machine learning is collecting enough data of sufficient quality to train a machine learning method. Training data is comprised of training input data and training target data. Generating perturbations for a training input data set allows for a much larger training data set than a set that is collected directly from existing examples. Because the dimensions of a perturbation are known, the difference between a perturbation and an ideal model can be calculated, providing the training target data.

There may be several advantages to generating a training data set for the objective function through perturbations. As discussed above, the method allows large, quality training data sets where the original data may have been scarce. The method allows training data sets to be automatically generated. In medical and dental applications especially; there may be regulations concerning the type of data used, since it may be personal data or sensitive personal data. In such case, the method provides artificial data to comply with these regulations.

In an embodiment to generate dental crowns, there may only be a finite number of library models. Generating perturbations based on various shape parameters, for example, scale, rotation, translation, would result a set of generated dental crowns that are different from a library model. Given multiple library models, many perturbations may be generated. The difference between a perturbation and an ideal model for a dental crown may also be calculated, and this data set could be used to train the quality estimation function.

In an embodiment, one way to generate training target data is to approximate the calculation of training target data by a Taylor expansion of the objective function based on shape parameters. Such an expansion typically may have advantageous numerical properties for many gradient-based optimization algorithms.

An embodiment further comprises selecting a suitable model from a plurality of models,
wherein the plurality of models is a plurality of perturbations.

In an embodiment, a plurality of perturbations may be used as a plurality of models, where a suitable model is selected based on the objective function as described above. This may be advantageous where speed is desired, as the plurality of perturbations may be calculated ahead of time, and evaluating each based on an objective function may be faster than generating a generated model through an iterative process.

For example, given a plurality of perturbations for a dental crown, a suitable dental crown may be selected from a pre-existing library based on the objective function.

An embodiment further comprises wherein a dental restoration, orthodontic appliance, and/or ear-related device is based on the generated model, the suitable model, a portion thereof, and/or a combination thereof.

A dental restoration may comprise one of more of the following: bridge, denture, crown, implant, implant guide, inlay, onlay, post and core, and/or veneer. The orthodontic appliance may comprise one of more of the following: bracket guide, clear aligner, expander, lingual wire, and/or quad helix. The ear-related device may comprise one of more of the following: fitted hearing aids, in-ear monitors, and/or noise protection devices.

An embodiment further comprises review of the generated model by a user.

The generated model may be subject to human review, for example, to catch any errors made by the automation. In one embodiment, a user such as a dental technician may visually examine the generated model to see that it is acceptable for its intended purpose. In an embodiment, the user may subject the generated model to further automatic review.

An embodiment further comprises output to a data format configured to manufacture a physical object from the generated model, any portion thereof, and/or any combination of the preceding.

Once a corresponding 3D mesh or transformed 3D mesh for an object has been generated, the mesh or a portion of it may be translated into a data format suitable for manufacture. In various embodiments, the generated 3D mesh may be a standard file type for 3D objects, including but not limited to: Collaborative Design Activity (COLLADA), Initial Graphics Exchange Specification (IDES), ISO 10303 (STEP STL, Virtual Reality Modeling Language (VRML).

An embodiment further comprises generating a physical object from the corresponding 3D mesh, the transformed mesh, the 3D model mesh, any portion of the preceding meshes, and/or any combination of the preceding by 3D printing or milling.

The methods described in this invention are meant to be applied to the physical world. Milling and 3D printing are methods to turn a 3D mesh or 3D file format into a physical object. Miffing is common in dentistry, since it allows durable, well-tested materials to be used. Dental mills carve out a 3D object that may require post-processing, such as curing. 3D printing is another method of generating physical objects, and one that is rapidly improving. It may allow custom objects to be made with less waste than traditional milling.

An embodiment comprises a computer program product embodied in a non-transitory computer-readable medium, the computer program product comprising computer-readable code being executable by a hardware data processor to cause the hardware data processor to perform one or more of the preceding steps.

The features of the method described above and in the following may be implemented as a computer program product and carried out on a data processing system or other processing means caused by the execution of computer-readable instructions. The instructions may be program code means loaded in a memory, such as a RAM, from a storage medium or from another computer via a computer network. Alternatively, the described features may be implemented by hardwired circuitry instead of software or in combination with software.

BRIEF DESCRIPTION OF THE DRAWINGS

The above and/or additional objects, features and advantages of the present invention, will be further described by the following illustrative and non-limiting detailed description of embodiments of the present invention, with reference to the appended drawing(s), wherein:

FIG. 2A shows an embodiment of an objective function with a single quality estimation function.

FIG. 2B shows an embodiment of the objective function comprising three quality estimation functions and two constraints.

FIG. 6A shows an embodiment where a model $\mathcal{M}$ is expressed mathematically.

FIG. 6B shows an embodiment where the representation of a three-dimensional model by a 2D pseudo-image is expressed mathematically FIG. 6C shows an embodiment where the objective function is expressed mathematically.

FIG. 6D shows an embodiment where the perturbations are expressed mathematically.

FIG. 6E shows an embodiment where shape parameters are used in the objective function, expressed mathematically.

FIG. 9 shows an embodiment with pseudo-images of dental surroundings with and without a crown, an example of training input data for generating a dental crown.

FIG. 10 shows an embodiment with pseudo-images with various dental crowns and associated quality estimation outputs.

FIG. 12 shows an embodiment of an application of a trained objective function to generate crowns.

DETAILED DESCRIPTION

In the following description, reference is made to the accompanying figures, which show by way of illustration how the invention may be practiced.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to A method according to one or more of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

Figure 1:
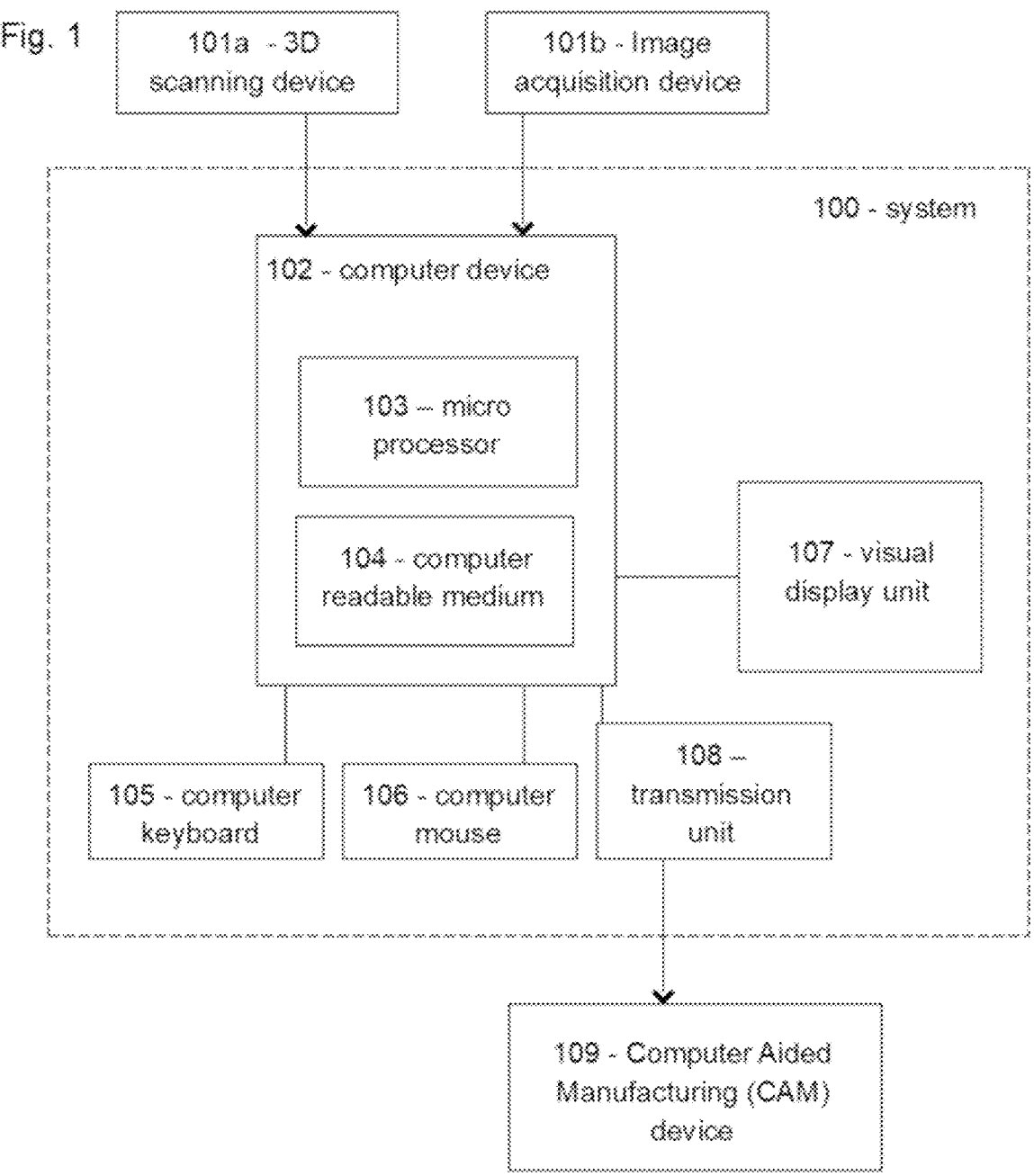
FIG. 1 shows a schematic of a system according to an embodiment of the disclosure.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of obtaining digital representations, for example, of at least a part of a patient's jaw including the jawbone from e.g. a CBCT scanner 101b. The obtained digital representations can be stored in the computer readable medium 104 and provided to the processor 103.

Additionally or alternatively, the computer device 102 is further capable of receiving a digital 3D representation, for example, of the surfaces of the patient's set of teeth and gingiva from an image acquisition device 101a, for example a 3D scanning device, such as the TRIOS intra-oral scanner manufactured by 3shape TRIOS NS, or capable of receiving scan data from such a 3D scanning device and forming a digital 3D representation of the patient's set of teeth and/or gingiva based on such scan data. The received or formed digital 3D representation can be stored in the computer readable medium 104 and provided to the microprocessor 103.

The system 100 is configured for allowing an operator to design a customized dental restoration using information obtained from the bone scan and/or the surface scan, with limits being set based on pre-determined design criteria. This can be realized for example by displaying the digital representation of the patient's jaw on the visual display unit 107, and the operator can then visualize his/her restoration design on the visual display unit, with respect to the surface of the patient's jaw.

The system comprises a unit 108 for transmitting the digital designs as an output data to a fabrication machine for generating a dental appliance, such as a customized dental restoration to e.g. a computer aided manufacturing (CAM) device 109 for manufacturing the customized dental restorations or to another computer system e.g. located at a milling or printing center where the customized dental restorations are manufactured. The unit for transmitting can be a wired or a wireless connection, and the transmission may be done for example using the internet or File Transfer Protocol (FTP).

The 3D scanning of the patient's set of teeth and/or gingiva using the 3D scanning device 101a, and/or the bone scan using the CBCT scanner 101b can be performed at a dentist while the designing of the customized dental restoration may be performed at a dental laboratory. In such cases the digital 3D representation of the patient's set of teeth and/or the 3D representation of the patient's jaw acquired from the CBCT scanner and/or scanning device can be provided via an internet connection between the dentist and the dental laboratory.

The system 100 as shown is an illustrative example. For example, the computer device 102 may comprise more than one micro processor 103 and/or more than one computer readable medium 104, the visual display unit 107 may be integrated in the computer device 102 or be separate from the computer device 102, etc.

FIG. 2A-2B shows various embodiments of the objective function.

FIG. 2A shows an embodiment of an objective function with a single quality estimation function. An objective function 201 is comprised of quality estimation function 202. Quality estimation function 202 outputs quality estimation output 204.

The quality estimation function 202 may output, for example, a difference measure, an estimated difference measure, and/or a subjective quality measure.

Objective function output 203 is based on quality estimation output 204. It may be, for example: equivalent to quality estimation output 203, a multiple of quality estimation output 203, the value of quality estimation output 203 put through a function.

FIG. 2B shows an embodiment of the objective function comprising three quality estimation functions and two constraints.

The quality estimations functions 206-208 are also quality estimation functions, as discussed above, outputting quality estimation outputs 212-214, respectively. However, each quality estimation function may take into account different considerations from the others, for example, in generating a dental crown they may represent other viewpoints (as discussed in FIG. 9), or even a subjective measure (as discussed above). The constraints outputs 215-216, based on constraints 209-210, may also affect the objective function output 211.

The objective function output 211 is based on quality estimation outputs 212-214, constraints 215-216, a portion thereof, a combination thereof, and/or a function thereof. For example, objective function output 211 may be the weighted sum of quality estimation outputs 212-214, with an additional penalty incurred by constraint output 215, with no change based on constraint output 216. It may also be, for example, a sum of quality estimation outputs 212-213, multiplied by a value associated with constraint output 216, minus the value of quality estimations output 214, and no change based on constraint output 215.

In an embodiment to generate a dental crown, quality estimation function 206 may be trained to predict a difference measure of a 2D representation of the occlusal surface of a preparation with and without a dental crown, quality estimation function 207 may be trained to predict a difference measure of the 2D representation of the mesial surface of a preparation with and without a dental crown, quality estimation functions 208 may be trained to predict a rating for the dental crown based on a database of subjective ratings from dental professionals, constraint 209 is triggered if a minimum thickness for overall crown is not met, and constraint 210 is triggered if the crown overlaps with a neighboring tooth.

The objective function output 211 may be the sum of quality estimation outputs 212-214 and constraint outputs 215-216, with quality estimation output 214 having a weight of 0.5, and constraint outputs 215-216 only affecting the objective function output 211 is some threshold value is met.

Figure 3A:
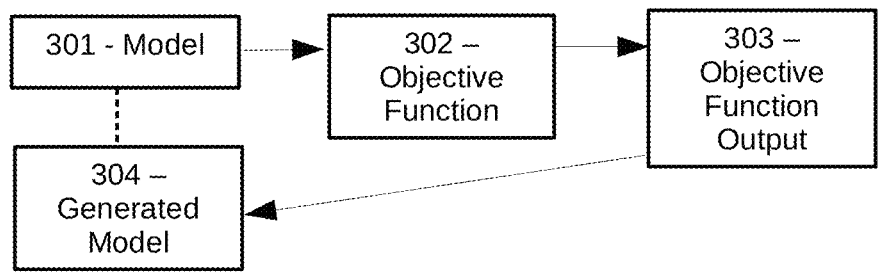
FIG. 3A shows an embodiment of a method of generating a model with the objective function.
Figure 3B:
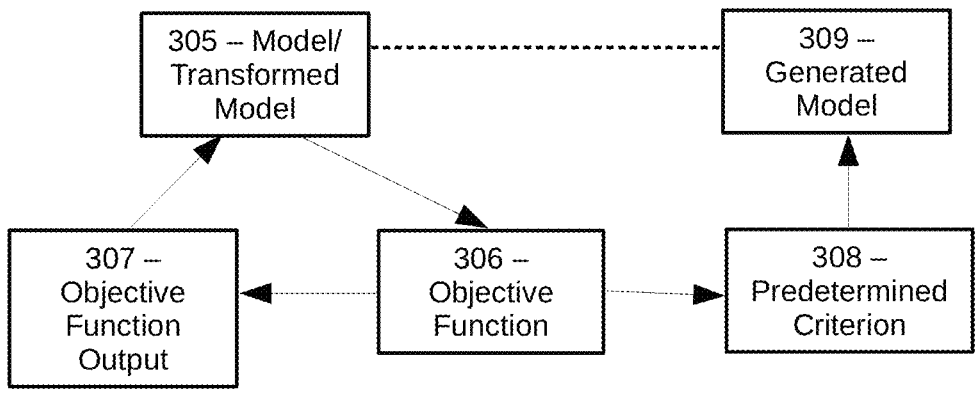
FIG. 3B shows an embodiment of a method of generating a model with the objective function iteratively.
Figure 3C:
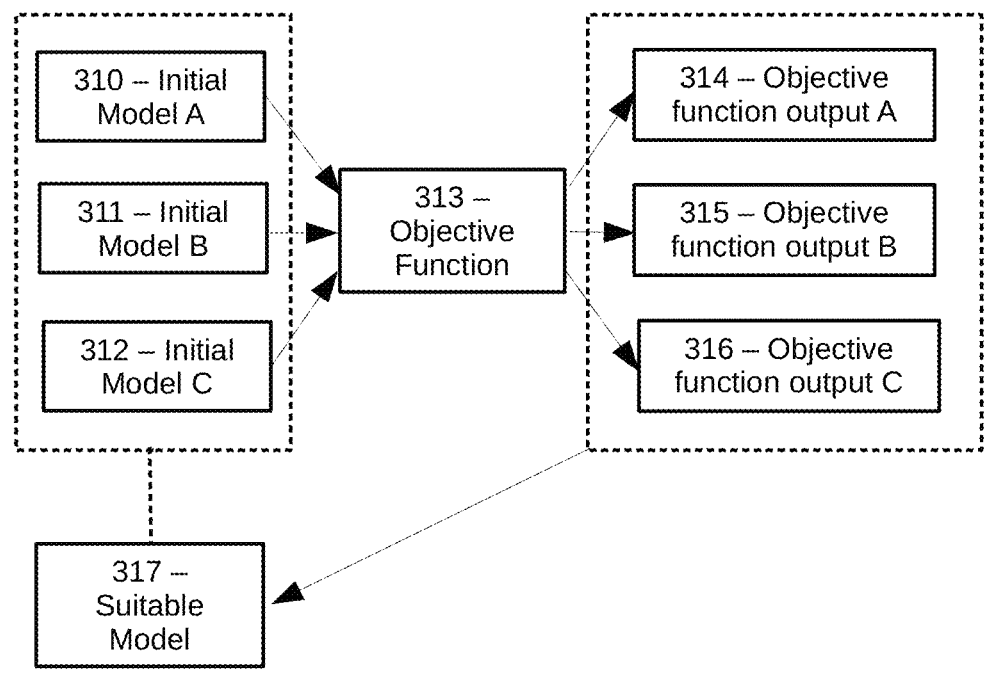
FIG. 3C shows an embodiment of a method of selecting a suitable model from a plurality of models with the objective function.

FIG. 3A-3C shows various embodiments using the objective function to generate a model. The model may, for example, come from a library model, a perturbation, and/or a digital object.

FIG. 3A shows an embodiment of a method of generating a model with the objective function. Model 301 is evaluated by an objective function 302, resulting in objective function output 303. Objective function output 303 is then used to guide changes to transform model 301 to generated model 304.

FIG. 3B shows an embodiment of a method of generating a model with the objective function iteratively.

Model 305 is evaluated by an objective function 306, resulting in objective function output 307. Based on objective function output 307, model 305 is transformed into transformed model 305. This cycle is iterated until predetermined criterion 308 is reached, and the transformed model 305 at that iteration is generated model 309.

FIG. 3C shows an embodiment of a method of selecting a suitable model from a plurality of models with the objective function.

A plurality of models 310 is comprised of initial models 311-313. Initial models 311-313 are evaluated by objective function 314, resulting in a plurality of objective function outputs 315, comprised of objective function outputs 316-318. The best score based on the comparison of the objective function outputs is used to select one of initial models 311-313 as suitable model 317.

Figure 4:
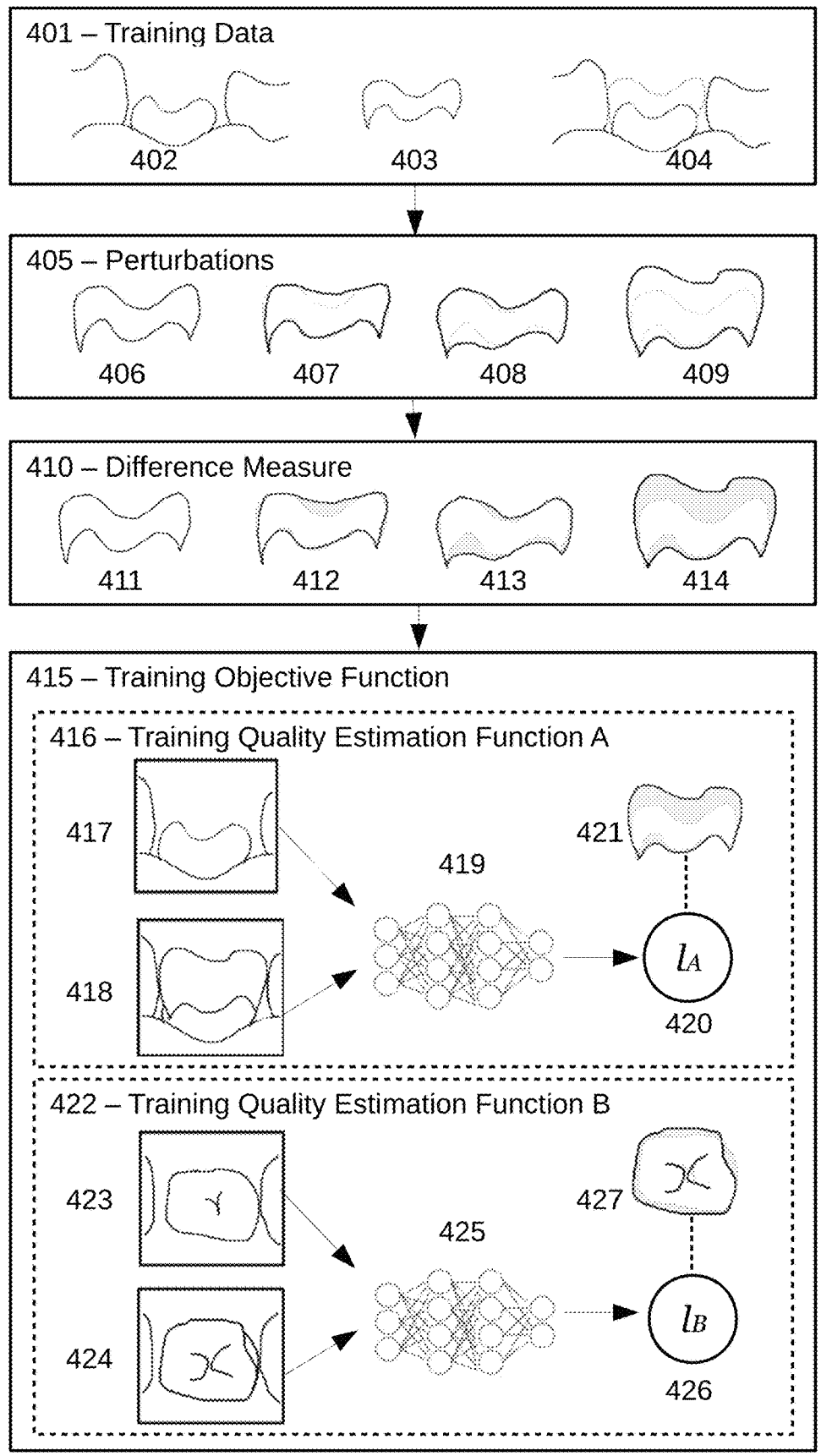
FIG. 4 shows an embodiment for the workflow for creating and training an objective function to generate a dental restoration.

FIG. 4 shows an embodiment for the workflow for creating and training an objective function to generate a dental restoration.

Step 401 illustrates underlying objects from a set of training data for a quality estimation function. Dental surroundings 402 comprise a preparation for a crown, neighboring teeth, and surrounding gingiva and jaw. Although not depicted, antagonist teeth may also be included. Crown 403 is a crown designed by a dental professional for dental surrounding 402. Dental surroundings with crown 404 shows the crown 403 placed in the dental surroundings 404.

Step 405 illustrates the transformation of crown representation 406 into perturbations 407-409. For step 405, dental crown 403 may be converted to a three-dimensional mesh as crown representation 406, and parametrized, then perturbed into perturbed crown representations 407-409, as described above.

As crown 403 is designed for the dental surroundings 402, it is considered the ground truth, the ideal crown to which other crowns are compared. As discussed above, shape parameters may be used to change crown 406. Values for these changes may be generated by a Gaussian distribution and applied to the crown, transforming crown representation 406 into the crown perturbations 407-409.

Step 410 shows obtaining the training target data. Crown representation 411 may be a representation of crown 403.

In an embodiment, the training target data may be a difference measure, the volumetric difference between the meshes of the ideal crown and the perturbed crowns. Crown representation 411 may be the same mesh as crown representation 406. Perturbed crown representations 412-414 may be the same meshes as perturbed crowns 407-409, respectively, and highlight the volumetric difference between each perturbed crown representation and the crown representation 411 in gray.

In an embodiment, the training target data may be a difference measure, a scalar number representing a measured difference in a pseudoimage based on the mesh. Crown representation 411 may be a pseudoimage based on the mesh of crown representation 406. Perturbed crown representations 412-414 may be pseudoimages based on the meshes of crown representations 407-409, respectively, and highlight the difference between each perturbed crown pseudoimage and the pseudoimage of the crown representation 411 in gray. This difference may be a scalar number representing the average difference in grayscale value for each pixel of the two pseudoimages.

In an embodiment, the training target data may also be an estimated different measure, for example, an approximation of the previously discussed difference measures by a mathematical formula, such as a Taylor expansion, as discussed below.

Step 415 shows training the objective function. Here, the step 415 shows the objective function comprising two quality estimation functions, for illustration purposes only, although the objective function may include more quality estimation functions and constraints, as discussed below.

Quality estimation function 416 shows neural network 419 being trained to output estimated difference measure 420.

The training input data comprises pseudo-image of the dental surroundings 417 and pseudo-image of the dental surroundings with a perturbed crown 418. The pseudoimage may be a 2D image calculated from a three-dimensional object, where the 2D image is a pixel array, and the grayscale value of each pixel represents a normalized distance from a viewpoint to the surface of the three-dimensional object.

For pseudo-image 417, this may be based on a three-dimensional scan of the dental surroundings, where the 2D image is calculated from a viewpoint from the buccal side of the dental surroundings. For pseudo-image 418, a three-dimensional representation of the perturbed crown may be digitally placed in the three-dimensional scan of dental surroundings, and the 2D image calculated in the same manner, and from the same viewpoint as for pseudo-image 417.

The training target data is estimated difference measure 421, where the estimated difference measure may be difference measures or estimated difference measures between crown representation 411 and the relevant perturbed crowns.

Neural network 419 is trained to generate quality estimation output 420, which is a prediction of the estimated difference measure 421. A more detailed description of how the neural network may be configured and trained in discussed below, in FIG. 11.

Quality estimation function 422 may be trained in a manner similar to quality estimation function 416, where the training data is taken from an occlusal viewpoint rather than a buccal viewpoint. Here, the training input data may comprise pseudo-image of dental surroundings 423 and pseudo-image of dental surroundings with perturbed crown 424, and the training target data may be the estimated difference measure from an occlusal viewpoint 427. The training data would be used to train neural network 425 to generate quality estimation output 426, which would predict an estimated different measure 427.

The objective function may further comprise quality estimation functions may be trained on training input data of pseudo-images from lingual, mesial, and/or distal viewpoints. The objective function may also comprise constraints, including, but not limited to: requiring a minimum material thickness for each perturbed tooth, limiting overlap between neighboring teeth and a dental crown, limiting overlap between antagonist teeth and a dental crown.

Figure 5:
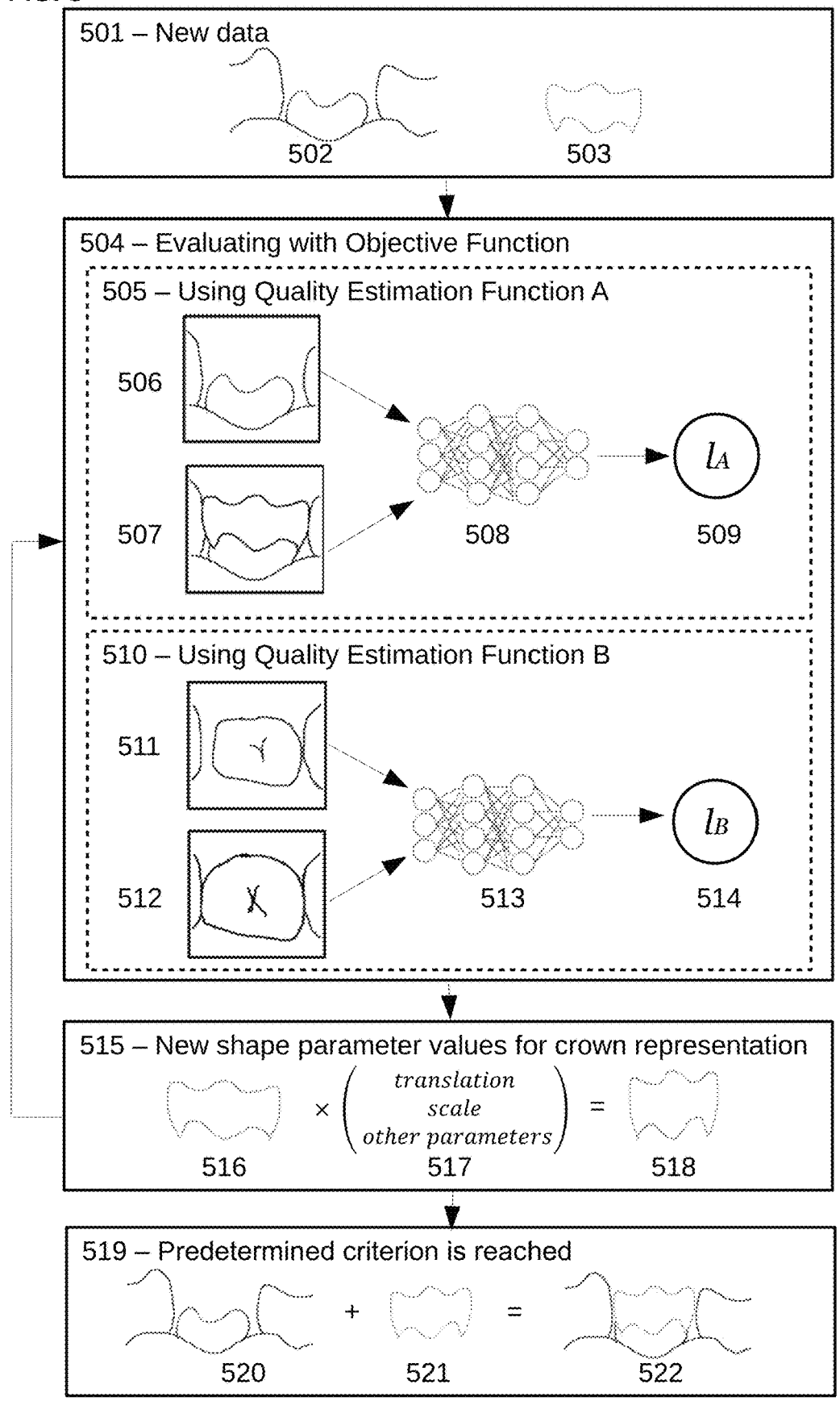
FIG. 5 shows an embodiment for the workflow for using the objective function from FIG. 4 to generate a dental restoration.

FIG. 5 shows an embodiment for the workflow for using the trained objective function from FIG. 4 to generate a dental restoration.

Step 501 shows new input data, comprising new dental surroundings representation 502 and a library crown representation 503, i.e. a representation of a crown model selected from a library comprising a plurality of crown models. The underlying objects for representations 502 and 503 are not illustrated, though they may have been converted to the representations in an unillustrated step.

Step 504 shows the first step of an iteration of using the trained objective function to generate a dental crown. In step 504, quality estimation functions 505 and 510 are used to evaluate a dental crown to output quality estimation outputs 509 and 514, which are predictions for the estimated difference measures from the buccal and occlusal viewpoints, respectively. The trained objective function in 504 is the objective function trained in step 415 in FIG. 4. Here, the step 504 shows the objective function comprising two quality estimation functions, for illustration purposes only, although the objective function may include more quality estimation functions and constraints, as discussed above.

The first iteration uses the library crown, but later iterations use transformed models of the library crown, as discussed below.

Pseudo-images 506, 507, 511, and 512 are representations of the dental surroundings with and without the crown, from the buccal and occlusal viewpoints, as described for corresponding pseudo-images 417, 418, 423, and 424, discussed above. Neural networks 508 and 513 are the trained neural networks 419 and 425 respectively. The objective function may further comprise quality estimation functions for other viewpoints and constraints, as discussed for FIG. 4.

Step 515 shows the second step of an iteration of using the objective function to generate a dental crown. Given the output of the objective function, new values for shape parameters 517 are applied to the crown representation 516 from step 504, and the resulting crown 518 is input to step 504. For example, given the output of the objective function, a slope is calculated based on the neural networks 508, 513, and any other neural networks or constraints in the objective function. This slope is used to choose the direction of incremental value changes in the shape parameters 517. The new values for shape parameters 517 are applied to the crown from step 504, and the resulting crown 518 is input to step 504.

The iterations repeat until some predetermined criterion is reached at step 519, for example, the optimum of the objective function, as discussed above. The generated crown 521 is the transformed crown of the final iteration, and can be placed in surroundings 502/520. The fit can be seen in the dental surroundings with the generated crown 522.

FIG. 6A-6D shows an embodiment where creating and using an objective function is expressed mathematically.

FIG. 6A shows an embodiment where a model $\mathcal{M}$ is expressed mathematically.

In dental CAD software, as in most CAD software for organic shapes, any model $\mathcal{M}$, may be described as $$\mathcal{M} = \{\mathcal{P}, \mathcal{F}\},$$

where $$\mathcal{P} = \{p_1, \ldots, p_P\}, p_i \in \mathbb{R}^3$$

is a set of points in 3D, and $$\mathcal{F} = \{f_1, \ldots, f_F\}, f_i \in \mathcal{P} \times \mathcal{P} \times \mathcal{P}$$

is a set of facets defined by point triplets.

In an embodiment, $\mathcal{M}$ may represent a model, e.g. a crown, and $\overline{\mathcal{M}}$ represents one or more related objects, e.g. tooth stump, neighboring teeth and antagonist teeth.

FIG. 6B shows an embodiment where the representation of a three-dimensional model by a 2D pseudo-image is expressed mathematically.

An embodiment may further comprise converting a three-dimensional model to 2D pseudo-images that are evaluated in an objective function. It may be advantageous to use 2D pseudo-images because data size can become smaller.

A conversion from a 3D model to 2D pseudo-images may be denoted $C(\mathcal{M}, \overline{\mathcal{M}})$. Several conversion methods are known from the art, such as rendering depth or curvature pseudo-images, cross sections, projections to a spherical surface, and others. Pseudo-images are often represented at pixel arrays. A conversion $C(\mathcal{M}, \overline{\mathcal{M}})$ may have multiple terms, for example for multiple views, such as from different directions and/or with different resolution. Pseudo-images can have multiple channels. Multiple channels can represent different views, and/or different renderings of the same scene, or renderings of variations of the scene, e.g., in the state before and after dental restoration design.

FIG. 6C shows an embodiment where the objective function is expressed mathematically.

An objective function L according to an embodiment may have the form $$L(C(\mathcal{M}, \overline{\mathcal{M}}))=l \in \mathbb{R}^1$$

In an embodiment, the above expression may also be denoted in brief as L. The objective function thus may take the 2D pseudo-images as input value, and its output is a scalar value l, that can be interpreted as a score.

It may be an aspect of an embodiment to learn an approximate representation of L given a training data set of triplets $$T=\{\{\mathcal{M}_1, \overline{\mathcal{M}}_1, l_1\}, \ldots, \{\mathcal{M}_K, \overline{\mathcal{M}}_K, l_K\}\},$$

where $l_i$ is small for $\{\mathcal{M}_i, \overline{\mathcal{M}}_i\}$ with desirable properties and large for non-desirable properties. The number of triplets is denoted K.

In an embodiment, L may have quality estimation functions with some mathematical structure, e.g., a neural net of a pre-defined number of layers or a regression model of given order, and some function parameters θ. In the case of a neural net, the function parameters θ could be the weights of neurons. For a quality estimation function of L having the structure of a multiple regression function, the function parameters θ could be the regression coefficients.

Optimal function parameters θ' may be learned as $$\theta' = \operatorname*{argmin}_{\theta} \sum_{i=1}^{K} g(l_i - L(\mathcal{M}_i, \overline{\mathcal{M}}_i))$$

The representation of L with this parameter set θ' is denoted L'. The cost function g in the above expression can be any metric over the real number, e.g. the absolute value. Many optimization algorithms are known in the art, such as gradient-based optimization algorithms, simplex, and others. The optimization may also be guided by a human through some user interface.

According to an embodiment, finding θ' requires triplets T. Preferably, the number of training triplets T is larger than the number of elements in θ. A training data set of triplets T may be found, e.g., by a human expert grading cases with various suggested shapes, or other methods. However, as the latter number can be very large, e.g., in neural nets, it may become impractical for human experts to generate enough training data. In some embodiments of this invention, training data are therefore generated at least partly automatically, e.g., on a computer.

FIG. 6C shows an embodiment where the perturbations are expressed mathematically.

In some preferred embodiments, models $\mathcal{M}_i$ given corresponding support models $\overline{\mathcal{M}}_i$ may be generated at least partly automatically, for example by perturbing a relatively small number N of expert-created models $\widehat{\mathcal{M}}_n$, n=1 . . . N, N<K. Expanding a training set then requires only expert grading, i.e., to have an expert assign $l_i$. It can be advantageous for perturbations to reflects the observed variability of restorations.

In some preferred embodiments of this invention, also the values of scores $l_i$ given pairs $\{\mathcal{M}_i, \overline{\mathcal{M}}_i\}$ may be generated at least partly automatically, such that entire triplets $T_i$ can be found automatically. For example, the score $l_i$ can be taken as a function of the magnitude of perturbation i. Such magnitude can be a known degree of deviation can, e.g., be a magnitude of a translation, rotation, scaling, etc.

With the approximate representation L' found, and for a given support model $\overline{\mathcal{M}}$, a model $\mathcal{M}'$ of a restoration with desirable properties can be found as an extremum. By convention, the optimum found in optimization may be a minimum, i.e., $$\mathcal{M}' = \operatorname*{argmin}_{\mathcal{M}} L'(C(\mathcal{M}, \overline{\mathcal{M}}))$$

FIG. 6E shows an embodiment where shape parameters are used in the objective function, expressed mathematically.

To make the optimization problem amenable for optimization algorithms, it may be advantageous to express shape by a preferentially small number of parameters that can be adjusted in a systematic way by said algorithms. Denoting β as the vector of such shape parameters, the expression for a parameterized model becomes $\mathcal{M}(\beta)$. Because the conversion C remains invariant during the generally iterative solution of the optimization problem, the objective function value in the iterations may depend only on β. The optimal parameters can be found from $$\beta' = \operatorname*{argmin}_{\beta} L'(C(\mathcal{M}(\beta), \overline{\mathcal{M}}))$$

In some embodiments of this invention, the parametrization $\mathcal{M}(\beta)$ may also be used to generate a set of $\mathcal{M}_i$ for a given support model $\overline{\mathcal{M}}$, to be used as training data. For example, a dental professional-created model can be written as $\widehat{\mathcal{M}}=\mathcal{M}(0)$. Perturbed models $\mathcal{M}_i$ can then be generated by perturbing β, for example by sampling a random $\beta_i$ from some distribution, preferably a distribution similar to that observed in natural cases, e.g., resulting in sampled shape sizes that are in agreement with human dentition.

Denoting the number of perturbations for each of the N expert-created shapes as P, the product PN may be large relative to the size of the parameter set θ, i.e., the number of values to be learned. PN may be greater than the size of the parameter set θ to be learned.

In some embodiments, the parametrization $\mathcal{M}(\beta)$ and perturbation of β may also be used to generate the scores l, such that a set training data set of triplets T is generated at least partly. For example, given a perturbed shape $\mathcal{M}(\beta)$, the score $l(\beta)$ can be generated as $$l(\beta) = \sum_{\text{Over all pixels}} (C(\mathcal{M}(\beta), \overline{\mathcal{M}}) - C(\mathcal{M}(0), \overline{\mathcal{M}}))^2$$

In the above expression, the score is the 2-norm of the difference between the pseudo image pixels of the expert shape and the morphed shape, respectively. Other norms could be used as well.

The approximate representation L' may be learned from many similar relevant cases, e.g., many patients' crown restorations of a tooth with a given tooth number.

FIG. 7A-7E show possible representations of 3D objects, in various embodiments.

Figure 7A:
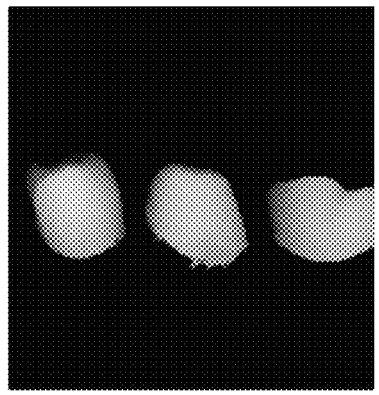
FIG. 7A shows a depth map of a molar, in an embodiment.

FIG. 7A shows a depth map of a molar, in an embodiment. A depth map may be derived from a picture of a 3D object, where the scale of each pixel is used to estimate its distance from the camera, and therefore its representation in three-dimensional space. Here, the molar is shown from multiple viewpoints.

Figure 7B:
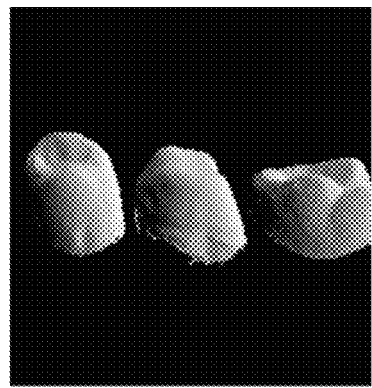
FIG. 7B shows a pseudo-image of a molar, in an embodiment.

FIG. 7B shows a pseudo-image of a molar, in an embodiment. A pseudo-image is a 2D image where the grayscale value of each pixel represents the normalized distance of a viewpoint from the 3D object at that point. This distance may be derived from a 3D scan. Here, the molar is shown from multiple viewpoints.

Figure 7C:
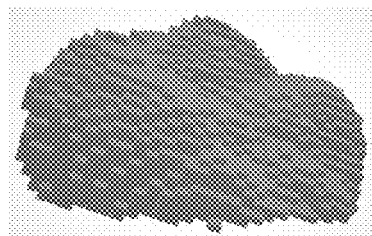
FIG. 7C shows a voxel representation of a molar, in an embodiment.

FIG. 7C shows a voxel representation of a molar, in an embodiment. Voxel representations use a three-dimensional grid to represent a 3D object. Each voxel may be a cube in a 3D space. If the object exists in that voxel, it is marked as present, and if not, it is absent. Here, a tooth is represented in voxels. Note that in this embodiment, the voxel size is especially large to more clearly illustrate the voxels. Smaller voxels may also be used, depending on the application.

Figure 7D:
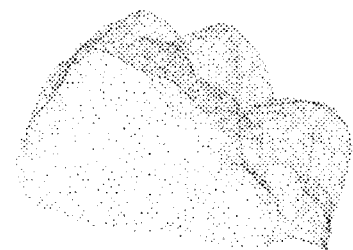
FIG. 7D shows a point cloud representation of the surface of a molar, in an embodiment.

FIG. 7D shows a point cloud representation of the surface of a molar, in an embodiment. Point clouds are a collection of points in 3D space, each with an x, y, z coordinate. Here, the surface of the molar from FIG. 7C is shown as a point cloud, although a point cloud may represent the volume.

Figure 7E:
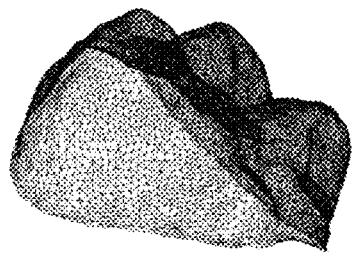
FIG. 7E shows a mesh representation of the surface of a molar, in an embodiment.

FIG. 7E shows a mesh representation of the surface of a molar, in an embodiment. A mesh is a collection of vertices, edges, and faces. Vertices are individual points representing the surface, edges are lines connecting the vertices, and faces are continuous areas surrounded by vertices and edges. Here, the surface of the molar from FIG. 7C-7D is represented as a triangular mesh.

Figure 8:
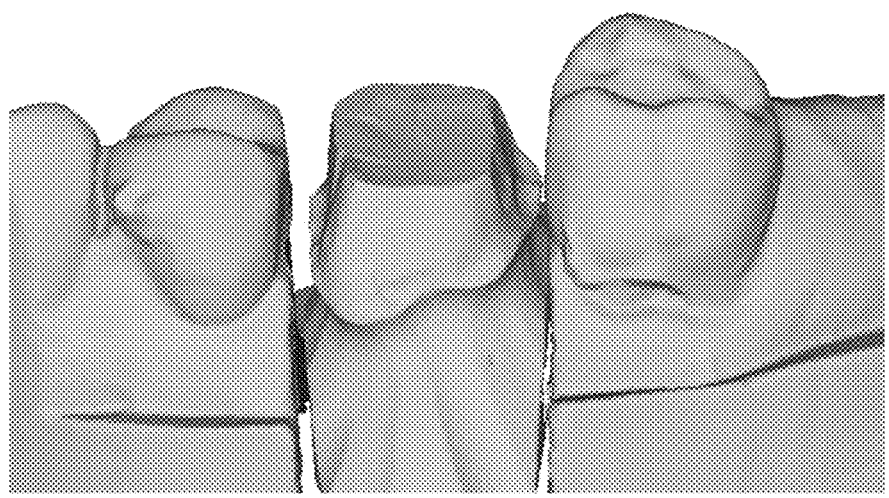
FIG. 8 shows an embodiment with a representation of dental surroundings.

FIG. 8 shows an embodiment with a representation of dental surroundings.

FIG. 8 shows an example of a dental case to which to apply an embodiment disclosed here, a gypsum cast model of a dental impression, including dental surroundings, taken after a dentist has prepared the central tooth in the figure for a single crown restoration, according to an embodiment. For illustrative purposes, the figure shows pseudo-imaged with depth information as calculated from the facets of a 3D scan of the gypsum cast.

FIG. 9 shows an embodiment with pseudo-images of dental surroundings with and without a crown, an example of training input data for generating a dental crown.

FIG. 9 shows an example of five conversions $C_d(\mathcal{M}, \overline{\mathcal{M}})$, $d=1\ldots 5$ for 5 view directions, according to an embodiment. Pseudo-images 901-905 represent the dental surroundings and Pseudo-images 906-910 represent the dental surrounding with a crown. View direction 901 and 906 are oblique distal, 902 and 907 are oblique mesial, 903 and 908 are oblique lingual, 904 and 909 are oblique buccal, and 905 are 910 occlusal. $C_d(\mathcal{M}, \overline{\mathcal{M}})$ yields pseudo-image based on an orthographic projection of the scene, with a virtual camera viewing from the given direction. To generate a channel of the pseudo-image, parallel rays from the camera may be traced to the surface, one ray per pixel. At the intersection of a ray with the surface, the dot product between the hit facet's normal and the normalized ray direction may be computed, and that dot product may be assigned to the pixel the ray originated from. Facets intersected from the back side may be ignored. Pixels whose rays do not hit any surface may be assigned a value of zero.

Each pseudo-image in FIG. 9 may have two channels A and B. Channel A is generated by only visualizing the dental surroundings $\overline{\mathcal{M}}$, i.e., the dental surroundings of FIG. 8, and is represented by pseudo-images 901-905. Channel B is created by including a crown $\mathcal{M}$ designed by a dental technician for the dental surroundings, and represented by pseudo-images 906-910. The dimension of the pseudo-images and hence of its two channels may be 75×75 pixels. The resolution for oblique distal and mesial pseudo images may be 4 pixels/mm and the resolution for the others may be 3 pixels/mm.

In an embodiment, the objective function to be learned may be composed of five quality estimation functions and has the form $$L = \sum_{d=1}^{5} L_d(C_d(\mathcal{M}, \overline{\mathcal{M}}))$$

where d denotes the index of the five conversions. Each quality estimation function $L_d$ may be trained independently.

FIG. 10 shows an embodiment with pseudo-images with various dental crowns and associated quality estimation outputs.

FIG. 10 shows five sets of pseudo-images for the occlusal view direction with associated quality estimation outputs 1011-1015. Pseudo-images 1001-1005 are representations of the dental surroundings, and pseudo-images 1006-1010 are representations of the dental surroundings with various crowns.

The training data is generated by creating, for each initial model $\overline{\mathcal{M}}$, a parameterized model $$\mathcal{M}(\beta): T_{\overline{\mathcal{M}}}(r_x, r_y, r_z, s_x, s_y, s_z, t_x, t_y, t_z) =$$

$$R(r_x, r_y, r_z) \begin{pmatrix} 1+s_x & 0 & 0 \\ 0 & 1+s_y & 0 \\ 0 & 0 & 1+s_z \end{pmatrix} (p - p_C) +$$

$$\begin{pmatrix} t_x \\ t_y \\ t_z \end{pmatrix} + p_C, \forall p \in \mathcal{P}$$

where $\mathcal{P}$ is the points of $\overline{\mathcal{M}}$, $p_c$ is the center of mass of $\overline{\mathcal{M}}$ and R is a Euler rotation matrix. Perturbations may then be generated by randomly sampling shape parameters (rotation, scale and translation) from the following distributions:

$r_x, r_y, r_z \in \mathcal{N}(0, 0.15^2)$rad, $s_x, s_y, s_z \in \mathcal{N}(0, 0.1^2)$ and $t_x, t_y, t_z \in \mathcal{N}(0, 0.3^2)$mm.

The values of quality estimation outputs 1011-1015 may be calculated using a second order Taylor expansion as $$l(\beta) = \sum_{\text{Over all pixels}} (C_d(\mathcal{M}(\beta), \overline{\mathcal{M}}) - C_d(\mathcal{M}(0), \overline{\mathcal{M}}))^2$$

where $$\beta = \{r_x, r_y, r_z, s_x, s_y, s_z, t_x, t_y, t_z\}$$

at $$\beta = \{0\}.$$

A number of N=18933 single-crown cases for Universal Numbering System (UNN) tooth 3 may be used, from initial models created by dental professionals. Each initial model may be perturbed P=150 times by affine transformations.

Figure 11:
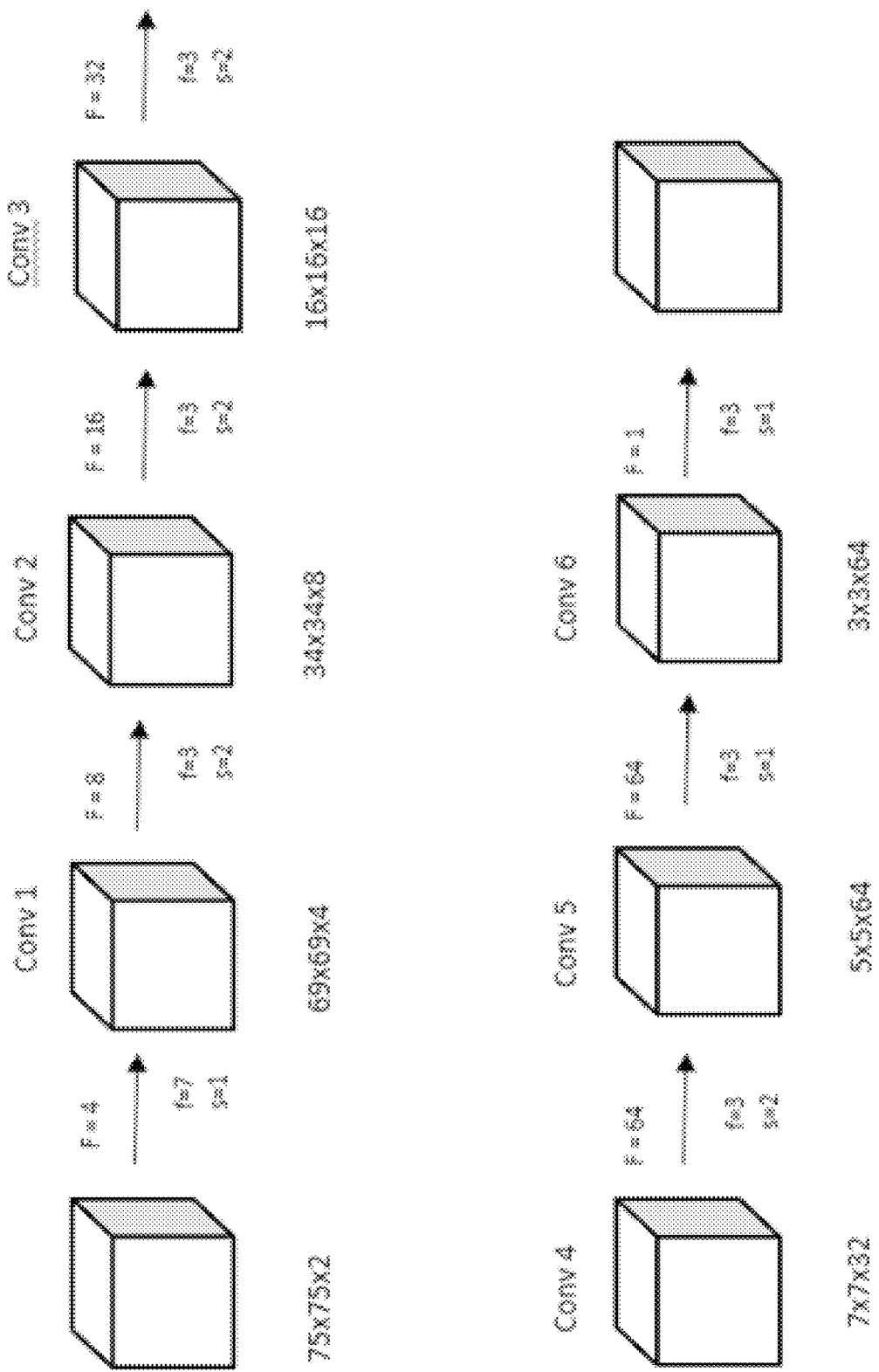
FIG. 11 shows an example of a neural network configuration used for each view direction model $L_d$, according to an embodiment.

FIG. 11 shows an example of a neural network configuration used for each view direction model $L_d$, according to an embodiment. In FIG. 11, a filter is a convolution followed by a Rectified Linear Unit (ReLU) operation. The input is $C(\mathcal{M}, \overline{\mathcal{M}})$, while the output is $l_d$, i.e., the score value found by the neural net. For a properly trained network, the values $l_d$ it predicts for a shape $\mathcal{M}(\beta)$ may be close to the $l(\beta)$ for the corresponding view direction d that the network was trained with, at least for $\beta \approx \{0\}$, i.e. near the unperturbed and hence generally optimal solution.

In FIG. 11, f denotes the filter size, s denotes the stride, and F denotes the number of filters. The number of weights and hence the number of function parameters θ is thus 62501. This number may be significantly smaller than the training set size, i.e., the product NP=18933·150=2839950. This may prevent overfitting of the network.

FIG. 12 shows an embodiment of an application of a trained objective function to generate crowns.

After training the five quality estimation functions in FIG. 10 independently, the resulting trained objective function may become $$L' = \sum_{d=1}^{5} L'_d(C_d(\mathcal{M}, \overline{\mathcal{M}})).$$

The values in 1201-1203 may be the values of the trained objective function L' for three different crown shapes. Value 1203 is the best score, as it is the minimum value for the objective function as described in FIG. 6C. In pseudo-images 1204-1209, two views of the combined crown and support mesh are shown, according to an embodiment. The crown shown in pseudo-images 1204 and 1207 is the initial placement of a library crown as found from the center of mass of the preparation and the general orientation of the jaw.

The crown shown in pseudo-images 1205 and 1208 is a generated model, the optimal affine morphing of the library crown. The affine morphing may be given by $$\mathcal{M}(\beta): T(R,t) = Rp + t, \forall p \in \mathcal{P}$$

where $R = \{r_{ij}\} \in \mathbb{R}^{3 \times 3}$ is any linear mapping $\mathbb{R}^3 \to \mathbb{R}^3$, $t = \{t_k\} \in \mathbb{R}^3$, and $\beta = \{\{r_{ij}\}, \{t_k\}\}$. The initial crown shown in 501-503 may be obtained for T(I,0) where I is the identity matrix. The total number of shape parameters for the affine morph is 12.

In pseudo-images 1206 and 1209, the optimal crown using second order spherical harmonic parameterization is shown. In the spherical harmonic parameterization, the affine morph function is generalized by applying a parametric mapping of p to $\hat{p} \in \mathbb{R}^3$ before the affine morph. The mapping may be $$\hat{p}_i = \begin{pmatrix} x(v_i) \left( \sum_{j=0}^{J} \phi_{j,i} s_j^x \right) + \sum_{j=0}^{J} \phi_{j,i} \tau_j^x \\ y(v_i) \left( \sum_{j=0}^{J} \phi_{j,i} s_j^y \right) + \sum_{j=0}^{J} \phi_{j,i} \tau_j^y \\ z(v_i) \left( \sum_{j=0}^{J} \phi_{j,i} s_j^z \right) + \sum_{j=0}^{J} \phi_{j,i} \tau_j^z \end{pmatrix},$$

where $$\psi_j = \{\phi_{j,1}, \ldots, \phi_{j,V}\}, j \in \{1, \ldots, J\}, \phi_{j,i} \in \mathbb{R},$$

may be fixed weights, $$s^x = \{s_j^x\}, j \in \{1, \ldots, J\}, s_j^x \in \mathbb{R}$$

$$s^y = \{s_j^y\}, j \in \{1, \ldots, J\}, s_j^y \in \mathbb{R}$$

$$s^z = \{s_j^z\}, j \in \{1, \ldots, J\}, s_j^z \in \mathbb{R}$$

may be per dimension scaling parameters, and $$\tau^x = \{\tau_j^x\}, j \in \{1, \ldots, J\}, \tau_j^x \in \mathbb{R}$$

$$\tau^y = \{\tau_j^y\}, j \in \{1, \ldots, J\}, \tau_j^y \in \mathbb{R}$$

$$\tau^z = \{\tau_j^z\}, j \in \{1, \ldots, J\}, \tau_j^z \in \mathbb{R}$$

may be per dimension translation parameters. Under this generalization $$\beta = \{\{r_{ij}\}, \{t_k\}, s^x, s^y, s^z, \tau^x, \tau^y, \tau^z\}.$$

In an embodiment, a method of calculating a set of fixed weights $\phi_{j,i}$ for library crowns that are closed, and have manifold genus-0, may be to map each vertex to the unit sphere e.g. using the method described in C. Gotsman, X. Gu, and A. Sheffer. Fundamentals of spherical parameterization for 3D meshes. ACM Transactions on Graphics, 22(3):358-363, 2003. Using $$\begin{pmatrix} \theta_i \\ \phi_i \end{pmatrix} \in \begin{pmatrix} \{0, \pi\} \\ \{0, 2\pi\} \end{pmatrix}$$

as spherical angular coordinates for vertex i, the mapping to cartesian coordinates on the unit sphere may then be $$x_i = \sin(\theta_i)\cos(\phi_i)$$

$$y_i = \sin(\theta_i)\sin(\phi_i)$$

$$z_i = \cos(\theta_i).$$

Mapping on a unit sphere may be particularly suitable for small library restorations, such as tooth libraries for crown design.

The fixed weights may be calculated using the real spherical harmonics $Y_l^m(\theta, \phi)$, of suitable order. For example, for the second order real spherical harmonics, the fixed weights may be:

$$\phi_{1,i} = \frac{1}{2}\sqrt{\frac{1}{\pi}}$$

$$\phi_{2,i} = \sqrt{\frac{3}{4\pi}}\, y_i$$

$$\phi_{3,i} = \sqrt{\frac{3}{4\pi}}\, z_i$$

$$\phi_{4,i} = \sqrt{\frac{3}{4\pi}}\, x_i$$

$$\phi_{5,i} = \frac{1}{2}\sqrt{\frac{15}{\pi}}\, x_i y_i$$

$$\phi_{6,i} = \frac{1}{2}\sqrt{\frac{15}{\pi}}\, y_i z_i$$

$$\phi_{7,i} = \frac{1}{4}\sqrt{\frac{5}{\pi}}\, (2z_i^2 - x_i^2 - y_i^2)$$

$$\phi_{8,i} = \frac{1}{2}\sqrt{\frac{15}{\pi}}\, z_i x_i$$

$$\phi_{9,i} = \frac{1}{4}\sqrt{\frac{15}{\pi}}\, (x_i^2 - y_i^2),$$

where $x_i$, $y_i$, and $z_i$ are the mapped spherical coordinates of vertex point i. The number of parameters optimized to generate the shape of the crown shown in column C is 12+6*9=66.

Figure 13:
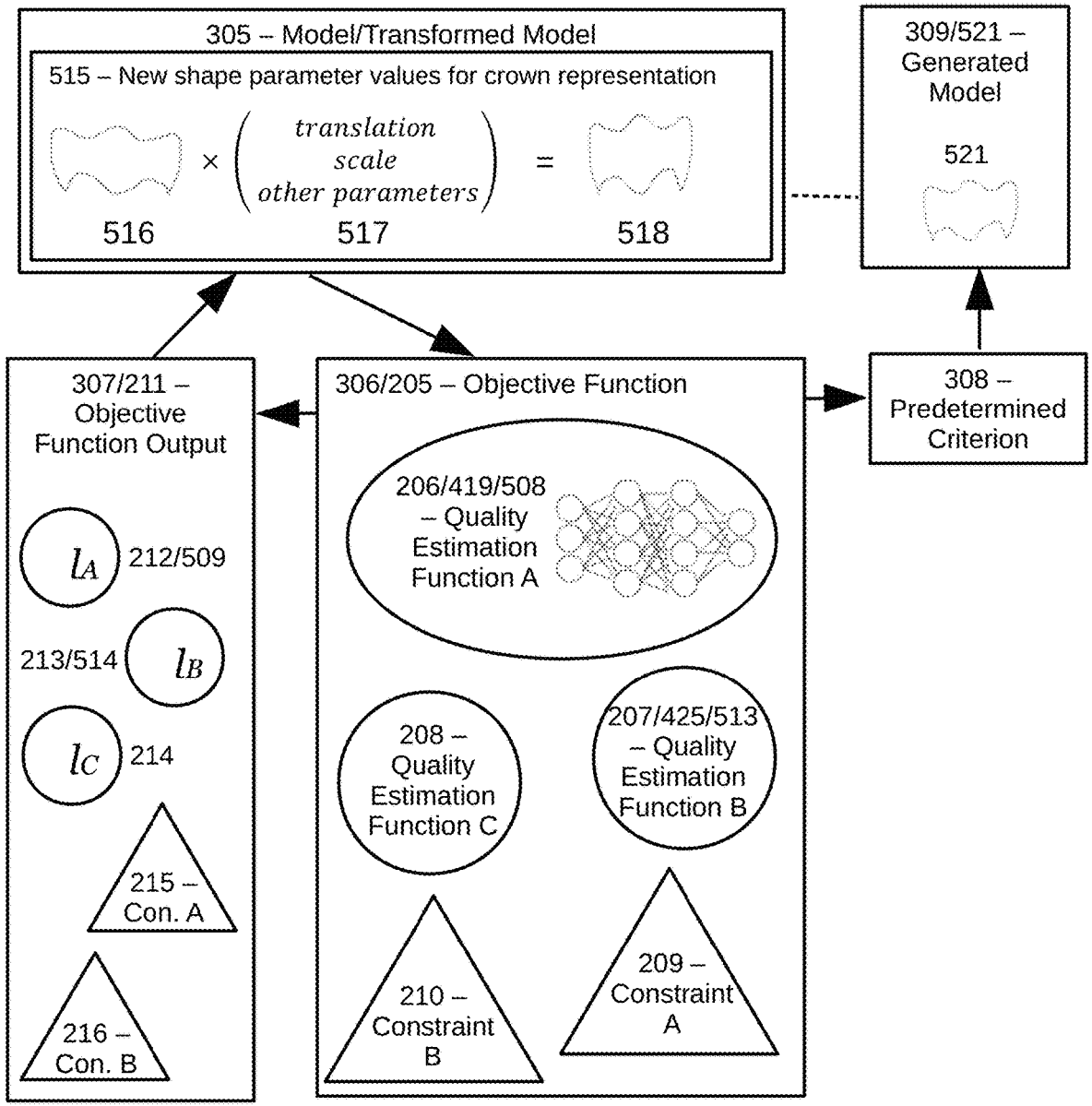
FIG. 13 is a combination of FIG. 2-5 to make explicit the architecture of an embodiment.

FIG. 13 is a combination of FIG. 2-5 to make explicit the architecture of an embodiment. FIG. 13 fills out the broader processes and items shown in FIGS. 2 and 3 with details from the embodiments shown in FIGS. 4 and 5.

FIG. 13 uses the format of FIG. 3B, with parts 305-309 tied to particular embodiments from FIG. 2-5. Model 305 from FIG. 3B may be crown representation 503, 516, or 518 from FIG. 5, depending on the iteration. For a given iteration, model 305 is modified based on the objective function 306.

In this embodiment, objective function 306 is shown as objective function 205 from FIG. 2B, comprising quality estimation functions 206, 207, and 208 and constraints 209 and 210. Quality estimation function 206 is embodied as the neural network 419/508, as trained in step 415 from FIG. 4 and used in step 515 from FIG. 5. Recall that neural network 419 does not output a model, but rather, a quality estimation output. Neural network 419 is also equivalent to neural network 518, as used in step 504. Similarly, quality estimation function 207 is embodied as neural network 425/513, from steps 415 and 504.

Applying objective function 306/205 to model 305 results in objective function output 307. This embodiment shows objective function output 307 as objective function output 211 from FIG. 2B. Objective function outputs 212 and 213 are embodied as quality estimation outputs 509 and 514, respectively.

Output 307/211 is then used to modify a model 305, in an embodiment, modifying crown representation 516 based on shape parameters 517 as described in step 515. This outputs another model 518, and the whole process is iterated until predetermined criterion 308 is met.

When predetermined criterion 308 is met, the final model 521 becomes the generated model 309. In this embodiment, per FIG. 5 described above, the predetermined criterion may be an optimum and the generated model 309 may be the generated crown 521.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor. The method may include one or more functions that any of the system components to perform one or more steps of the method disclosed in one or more embodiments of this disclosure.

In this disclosure, the term data format has been used as is commonly used in mathematics and computer science, as the type of format used to store the relevant data. Examples of data formats include: scalars, vectors, vectors of scalar number, matrices, characters, strings, etc.

The invention claimed is:

1. A computer-implemented method of generating a dental model based on an objective function output, comprising:
    creating an objective function comprising at least one quality estimation function, wherein each of the at least one quality estimation functions trains at least one machine learning method that generates quality estimation output based on training input data to be at least substantially the same as training target data, and an objective function output is the output of the objective function, and comprises the quality estimation output of the at least one quality estimation function, a portion thereof, a function thereof, or combinations thereof;
    providing a model as input data to the objective function and generating model-related objective function output; and
    modifying the model based on the model-related objective function output to transform the model to a generated model, wherein the generated model is the generated dental model:
    after the machine learning method is trained, providing new input data based on an initial model to the objective function, to generate objective function output based on the provided new input data in an iterative manner,
    with further input data, based on a transformed model generated in response to the objective function output of the objective function, acting as the new input data for a next iteration, until a predetermined criterion is reached, wherein the transformed model that corresponds to reaching the predetermined criterion represents the generated model,
    wherein the objective function further comprises at least one constraint, wherein the at least one constraint implements at least one rule, such that if the initial model or the transformed model violates the at least one rule, the objective function output from the objective function is changed, and
    wherein the dental model is a dental crown and the at least one constraint is a minimum material thickness of the crown.

2. The method of claim 1, where the objective function is used as an automated quality assessment of an existing model.

3. A method according to claim 1, where the predetermined criterion comprises an optimum of the objective function.

4. A method according to claim 1, further comprising selecting a suitable model from a plurality of models, based on the objective function output of each of the plurality of models.

5. A method according to claim 1, further comprising transforming the initial model or the transformed model by means of at least one shape parameter,
- wherein the at least one shape parameter controls an aspect of the shape of the initial model or the transformed model,
- and the transformation is based on the quality estimation output or the objective function output.

6. A method according to claim 1, wherein at least one of the at least one constraint applies a penalty,
- wherein the violation of the at least one rule applies the penalty to the objective function output of the objective function.

7. A method according to claim 1, where the training target data is a difference measure,
- comprising at least one measured difference between a sample model and an ideal model, and the training target data is based on the sample model and the ideal model.

8. A method according to claim 1, where the training target data is an estimated difference measure,
- comprising at least one estimated difference between the sample model and the ideal model, and the training input data is based on the sample model and the ideal model.

9. A method according to claim 1, where the training target data is a subjective quality measure,
- comprising a value representing the subjective quality of a sample model, and the training input data is based on the sample model.

10. A method according to claim 1, where the initial model, the transformed model, and the generated model are 3D objects, and the training input data and the new input data comprise at least one representation of at least one of the 3D objects.

11. A method according to claim 1, wherein at least one of the at least one representation of the 3D object is a pseudo-image.

12. A method according to claim 1, further comprising where the training input data is a plurality of perturbations,
- generated by using at least one known model, where each of the at least one known model is transformed into a set of perturbations,
- and the plurality of perturbations comprises all of the sets of perturbations.

13. A method according to claim 1, further comprising selecting the suitable model from a plurality of models,
- wherein the plurality of models is the plurality of perturbations.

14. A method according to claim 1, further comprising review of the generated model by a user.

15. A method according to claim 1, further comprising output to a data format configured to manufacture a physical object from the generated model, or any portion thereof.

16. A method according to claim 1, further comprising making the physical object based on the generated model or a portion thereof.

17. A method according to claim 1, wherein the manufacturing is done by 3D printing or milling.

18. A computer program product embodied in a non-transitory computer readable medium, the computer program product comprising computer-readable code being executable by a hardware data processor that causes the hardware data processor to perform according to claim 1.

* * * * *

UNITED STATES PATENT AND TRADEMARK OFFICE
CERTIFICATE OF CORRECTION

PATENT NO. : 12,138,132 B2
APPLICATION NO. : 17/429108
DATED : November 12, 2024
INVENTOR(S) : Henrik Öjelund, Karl-Josef Hollenbeck and Erik Ask Page 1 of 1

It is certified that error appears in the above-identified patent and that said Letters Patent is hereby corrected as shown below:

In the Claims

Column 26, Line 16, Claim 13, please delete "claim 1" and insert -- claim 12 --

Column 26, Line 25, Claim 16, please delete "claim 1" and insert -- claim 15 --

Column 26, Line 28, Claim 17, please delete "claim 1" and insert -- claim 15 --

Signed and Sealed this
Seventh Day of January, 2025

Derrick Brent
*Acting Director of the United States Patent and Trademark Office*